US012689108B2

(12) United States Patent
Watanabe et al.

(10) Patent No.: US 12,689,108 B2
(45) Date of Patent: Jul. 21, 2026

(54) MULTIPLEXER, AND SPECTRUM ANALYZER, SIGNAL ANALYZER, AND SIGNAL GENERATION DEVICE USING SAME, AND MULTIPLEXER CONTROL METHOD

(71) Applicant: ANRITSU CORPORATION, Kanagawa (JP)

(72) Inventors: Kenichi Watanabe, Kanagawa (JP); Yuji Kishi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 345 days.

(21) Appl. No.: 18/626,532

(22) Filed: Apr. 4, 2024

(65) Prior Publication Data

US 2024/0347889 A1      Oct. 17, 2024

(30) Foreign Application Priority Data

Apr. 14, 2023      (JP) ................................. 2023-066528

(51) Int. Cl.
*H01P 5/12* (2006.01)
*H04L 43/08* (2022.01)

(52) U.S. Cl.
CPC ................ *H01P 5/12* (2013.01); *H04L 43/08* (2013.01)

(58) Field of Classification Search
CPC ........... H01P 5/12; H01P 1/2138; H04L 43/08
See application file for complete search history.

(56) References Cited

U.S. PATENT DOCUMENTS

| | | | | |
|---|---|---|---|---|
| 6,710,813 | B1* | 3/2004 | Grandchamp | H01P 1/2138 348/E11.003 |
| 8,761,026 | B1* | 6/2014 | Berry | H01P 5/12 327/403 |
| 9,397,378 | B2* | 7/2016 | Hasegawa | H01P 1/213 |
| 11,493,578 | B1* | 11/2022 | Abuelhaija | G01R 33/3664 |
| 12,574,999 | B2* | 3/2026 | Van Der Velde | H04W 76/15 |
| 2013/0100971 | A1* | 4/2013 | Kunes | H04J 1/08 370/537 |
| 2015/0092707 | A1* | 4/2015 | Kwon | H04W 76/38 370/329 |
| 2017/0317711 | A1* | 11/2017 | Jian | H04B 1/525 |
| 2018/0309464 | A1* | 10/2018 | Mandegaran | H04B 1/52 |

(Continued)

FOREIGN PATENT DOCUMENTS

| | | |
|---|---|---|
| JP | 2016-184831 A | 10/2016 |
| JP | 2019-087862 A | 6/2019 |

*Primary Examiner* — Will W Lin
(74) *Attorney, Agent, or Firm* — McDonald Hopkins LLC

(57) ABSTRACT

Provided is a multiplexer that can easily vary the passband without switching filters, and is adaptable to high-precision measurement, analysis, and testing of high-frequency signals with a simple and inexpensive structure, and a spectrum analyzer, signal analyzer, and signal generation device using the same, and a multiplexer control method. The multiplexer 10 includes two BPFs 20a1 that are connected in parallel between a hybrid coupler 18a1 and a hybrid coupler 19a1, a BPF 20b1 that is connected to a port P4 of the hybrid coupler 18a1 and has a passband adjacent to a passband of the BPF 20a1, and passband variable means 40a, 40b, and 40c that vary the passbands of the BPFs 20a1 and the hybrid coupler 18a1 within a range of bands forming mutually overlapping bands within a predetermined frequency range.

11 Claims, 16 Drawing Sheets

(56) References Cited

U.S. PATENT DOCUMENTS

| 2019/0097675 A1* | 3/2019 | Mizoguchi ............ H01P 1/2056 |
| 2020/0028234 A1* | 1/2020 | Uemichi .................. H04B 1/52 |
| 2020/0161736 A1* | 5/2020 | Uemichi ................ H01P 5/182 |
| 2020/0351722 A1* | 11/2020 | Yang ..................... H04W 36/08 |
| 2022/0132333 A1* | 4/2022 | Mattam ................ H04W 24/02 |
| 2024/0313933 A1* | 9/2024 | Wei .......................... H04L 5/00 |

* cited by examiner

P1 : Input
P2 : Through
P3 : Couple
P4 : Isolated

| Frequency band f0/Bw0 | Frequency band f0/Bw1 | Frequency band f0/Bw1 |
|:---:|:---:|:---:|
| FIG.5B | FIG.5C | FIG.5D |

10-1

Input

P1   P2   HPF fc1   P1   P2

HPF fc1

P4   P3            P4   P3   Output1
$f_{out} > fc1$

P1   P2   BPF f2   P1   P2

BPF f2

Output3   P4   P3            P4   P3   Output2
$f_{out} < f2$                              $f_{out} = f2$ P1 : Input
P2 : Through
P3 : Couple
P4 : Isolated

MULTIPLEXER, AND SPECTRUM ANALYZER, SIGNAL ANALYZER, AND SIGNAL GENERATION DEVICE USING SAME, AND MULTIPLEXER CONTROL METHOD

TECHNICAL FIELD

The present invention relates to a multiplexer having a circuit structure including a pair of filters disposed between hybrid couplers as a base, and having a function of varying the passband of the filter, and a spectrum analyzer, signal analyzer, and signal generation device using the same, and a multiplexer control method.

BACKGROUND ART

Examples of a filter for extracting a signal component in a desired passband from an input signal include a waveguide filter that uses a waveguide having a waveguide path through which the signal component is introduced and passed.

As an example of a waveguide filter, an inductive iris-coupled waveguide filter has been known in which a plurality of cavity resonators are coupled via a plurality of irises (for example, Patent Document 1, or the like). This inductive iris-coupled waveguide filter has a structure in which a first inductive iris and a second inductive iris are arranged on the input side and the output side, respectively.

In addition, a filter bank structure has been known in which a filter block in which a plurality of waveguide paths are formed by waveguides is formed is mechanically moved to a position where both ends of the designated waveguide path are connected to the waveguide path of the first fixed waveguide block and the waveguide path of the second fixed waveguide block (for example, Patent Document 2, or the like).

RELATED ART DOCUMENT

Patent Document

[Patent Document 1] JP-A-2016-184831
[Patent Document 2] JP-A-2019-87862

DISCLOSURE OF THE INVENTION

Problem that the Invention is to Solve

A spectrum analyzer is known in which the waveguide filter as described in Patent Document 1 or the waveguide block switching mechanism as described in Patent Document 2 is used for a filter unit that extracts signals in a plurality of frequency bands from a signal to be measured.

Due to the rapid progress in communication technology these days related to 5G and various wireless communications, in order to acquire even more advanced communication technology in the future, there is a need for spectrum analyzers to be able to accurately detect whether there is an influence from spurious components in higher frequency bands such as the millimeter wave (200 GHz to 300 GHz, or the like) bands. Similar demands are also increasing for signal analyzers that can use the above-described waveguide filter and waveguide block switching mechanism for the filter unit, and signal generation devices that generate test signals for testing the reception sensitivity of devices under test (DUT).

In order to meet the above-described demands, some spectrum analyzers in the related art employ a filter bank having a configuration as shown in FIG. 17, for example, as a filter unit. In FIG. 17, filters $91a$, $91b$, and $91c$ each have two hybrid couplers 93, 94 (hybrid coupler $93a1$ and $94a1$, $93b1$ and $94b1$, and $93c1$ and $94c1$), and a pair of filters $95a1$, $95b1$, and $95c1$ are arranged between the two hybrid couplers 93 and 94, respectively. A filter bank using branch line couplers (BLC) as the hybrid couplers 93 and 94 is called a BLC filter bank.

In a spectrum analyzer using a BLC filter bank, there is no need to perform mechanical switching between filters with different passbands, and the signals in the desired band can be obtained by simply extracting the signals passing through the filters $95a1$, $95b1$, and $95c1$ of the filter $91a$, $91b$, and $91c$.

However, the BLC filter bank was originally not designed to overlap the passbands between the adjacent filters $95a1$, $95b1$, and $95c1$. Therefore, in order to prevent signal measurement (or analysis, or DUT testing) from becoming impossible and to ensure overlap, it is necessary to provide a plurality of BLC filter banks as shown in FIG. 17 and switch each BLC filter bank between groups.

For this reason, in the spectrum analyzers, signal analyzers, and signal generation devices in the related art that use the BLC filter banks as shown in FIG. 17, the configuration for switching the filter unit and its switching control have become complex, and it has been extremely difficult to measure, analyze, or test frequency components in higher frequency bands such as millimeter waves, with a simple and inexpensive configuration.

The present invention has been made to solve these problems in the related art, and an object of the present invention is to provide a multiplexer that can easily vary the passband without switching filters and is adaptable to high-precision measurement, analysis, and testing of high-frequency signals with a simple and inexpensive structure, and a spectrum analyzer, signal analyzer, and signal generation device using the same, and a multiplexer control method.

Means for Solving the Problem

In order to solve the above problem, a multiplexer according to claim 1 of the present invention is a multiplexer including a first hybrid coupler ($18a1$) and a second hybrid coupler ($19a1$) which each have a port P1 (Input), a port P2 (Through), a port P3 (Couple), and a port P4 (Isolated), and are configured with a circuit network that distributes or combines signals, a first filter ($20a1$) consisting of two filters which have substantially the same characteristics and are connected in parallel between the ports P2 and P3 of the first hybrid coupler and the ports P1 and P4 of the second hybrid coupler, and a second filter ($20b1$) connected to the port P4 of the first hybrid coupler and having a passband adjacent to a passband of the first filter of the second hybrid coupler, in which an input signal from the port P1 of the first hybrid coupler is distributed to the first filter, and the input signal that passes through the first filter is combined at the second hybrid coupler and output from the port P3 of the second hybrid coupler, while the input signals are reflected, combined at the first hybrid coupler, and output from the port P4 of the first hybrid coupler to the second filter, and passband variable means ($40a$, $40b$, $40c$) are provided for varying the passbands of the first filter and the second filter within a range of bands forming mutually overlapping bands within a predetermined frequency range.

With this configuration, the multiplexer according to claim 1 of the present invention varies the passbands of the first filter and the second filter using the passband variable means, thereby easily and continuously varying the passbands without switching the filters, and performing high-precision measurement, analysis, and testing of high-frequency signals, with a simple and inexpensive structure.

Further, in the multiplexer according to claim 2 of the present invention, with a configuration including the first hybrid coupler, the second hybrid coupler, the first filter, and the second filter as a basic unit, a plurality of the basic units may be connected in order such that the port P1 of the first hybrid coupler of a subsequent basic unit is connected to the port P4 of the first hybrid coupler or the port P3 of the second hybrid coupler of a previous basic unit, and the first filters and the second filters of the previous and subsequent basic units may vary the passbands such that overlapping bands are formed through continuous bands.

With this configuration, the multiplexer according to claim 2 of the present invention can easily construct a filter structure adaptable to a desired passband expanded by combining a plurality of basic units, with a simple structure, and also facilitates high-precision measurement, analysis, and testing of high-frequency signals.

Further, in the multiplexer according to claim 3 of the present invention, the first filter and the second filter of each of the basic units may be configured with any one type or a mixture of a plurality of types of a band-pass filter, a high-pass filter, and a low-pass filter.

With this configuration, the multiplexer according to claim 3 of the present invention is configured with hybrid couplers and any one type or a mixture of a plurality of types of a band-pass filter, a high-pass filter, and a low-pass filter to easily achieve a filter structure of a desired specification.

Further, in the multiplexer according to claim 4 of the present invention, the first filter and the second filter may be configured with a waveguide filter (20), and the waveguide filter may include a waveguide portion (30) provided with a first waveguide portion (31a) and a second waveguide portion (31b) which each have a rectangular parallelepiped shape, and in which grooves (35a, 35b) to become a waveguide path (35) are formed on one-side surfaces (32a, 32b) in a longitudinal direction from one end (33) to the other end (34) in the longitudinal direction, the waveguide path is formed by the grooves in a state where the first waveguide portion and the second waveguide portion are arranged facing each other such that the one-side surfaces face each other, and a passband of the waveguide path changing according to a gap between the one-side surface of the first waveguide portion and the one-side surface of the second waveguide portion, and a gap adjustment mechanism (43, 43A) that configures the passband variable means and varies the gap in the waveguide portion to set a desired passband.

With this configuration, the multiplexer according to claim 4 of the present invention uses the gap adjustment mechanism that adjusts the gap between the first waveguide portion and the second waveguide portion of the waveguide filter to easily implement the passband variable means.

Further, in the multiplexer according to claim 5 of the present invention, the gap adjustment mechanism (43A) may include a first stage member (52a) on which the first waveguide portion is placed, a second stage member (52b) on which the second waveguide portion is placed so as to face the first waveguide portion, and drive means (50a, 50b) for driving the first stage member and the second stage member to be able to move symmetrically with respect to a plane of symmetry such that the gap between the first waveguide portion and the second waveguide portion changes.

With this configuration, the multiplexer according to claim 5 of the present invention drives the first stage member and the second stage member to move symmetrically with respect to a plane of symmetry by drive means, thereby easily and continuously varying the gap between the first waveguide portion and the second waveguide portion, and improving the filter characteristics when the passband is varied.

Further, in the multiplexer according to claim 6 of the present invention, the waveguide portion may input a signal to be measured in the predetermined frequency range into the waveguide path, and output, among a plurality of overlapping frequency bands, a frequency component of any one of the bands that matches a passband corresponding to the gap.

With this configuration, the multiplexer according to claim 6 of the present invention can set a desired passband among a plurality of passbands within a predetermined frequency range according to the gap, by varying the gap using the gap adjustment mechanisms.

In order to solve the above problem, a spectrum analyzer according to claim 7 of the present invention is a spectrum analyzer (1) which includes a frequency conversion unit (100) that gives a signal to be measured in a predetermined frequency range and a local signal output from a local signal generator (112) to a mixer (111D) and has a filter (113) that extracts a signal in a predetermined intermediate frequency band from the mixed output, and a detector (120) that detects the signal in the intermediate frequency band, and changes a frequency of the local signal in accordance with an analysis target frequency to obtain spectral characteristics of the signal to be measured, the spectrum analyzer (1) including: the multiplexer (10A) according to claim 1 provided in a previous stage of the frequency conversion unit; and passband variable control means (151) for driving and controlling the passband variable means to set the passband corresponding to one frequency band of the analysis target frequency, in which a frequency component corresponding to one frequency band of the analysis target frequency is measured through the multiplexer.

With this configuration, the spectrum analyzer according to claim 7 of the present invention varies the passbands of the first filter and the second filter using the passband variable means, thereby easily and continuously varying the passbands without switching the filters, and performing high-precision measurement of high-frequency signals, with a simple and inexpensive structure.

Further, in the spectrum analyzer according to claim 8 of the present invention, with a configuration including the first hybrid coupler, the second hybrid coupler, the first filter, and the second filter as a basic unit, the multiplexer (10A) may be configured by combining the plurality of basic units (10-11, 10-12), and the first filter and the second filter of each of the basic units may vary the passbands such that overlapping bands are formed through continuous bands.

With this configuration, the spectrum analyzer according to claim 8 of the present invention can easily construct a multiplexer filter structure adaptable to a desired passband expanded by combining a plurality of basic units, with a simple structure, and also facilitates high-precision measurement, analysis, and testing of high-frequency signals.

In order to solve the above problem, a signal analyzer according to claim 9 of the present invention is a signal analyzer (2) which includes a frequency conversion unit (100D) that gives a signal to be measured in a predetermined frequency range and a local signal output from a local signal generator (112) to a mixer (111D) and has a filter (113D) that extracts a signal in a predetermined intermediate frequency band from the mixed output, and a signal analysis unit (153D) that analyzes a waveform of a digital signal obtained by converting the signal in the intermediate frequency band by an ADC 125, and changes a frequency of the local signal in accordance with an analysis target frequency to analyze a waveform of the signal to be measured, the signal analyzer (2) including: the multiplexer (10A) according to claim 1 provided in a previous stage of the frequency conversion unit; and passband variable control means (151D) for driving and controlling the passband variable means to set the passband corresponding to one frequency band of the analysis target frequency, in which a signal of a frequency component corresponding to the one frequency band of the analysis target frequency is analyzed through the multiplexer.

With this configuration, the signal analyzer according to claim 9 of the present invention varies the passbands of the first filter and the second filter using the passband variable means, thereby easily and continuously varying the passbands without switching the filters, and performing high-precision analysis of high-frequency signals, with a simple and inexpensive structure.

In order to solve the above problem, a signal generation device according to a tenth aspect of the present invention is a signal generation device (3) including a frequency conversion unit (100E) that gives a test signal in an intermediate frequency band output by a signal generation unit (130) and a local signal output from a local signal generator (112E) to a mixer (111E) and converts the test signal and the local signal into a signal in a predetermined frequency range, the signal generation device changing a frequency of the local signal in accordance with a test target frequency for testing a device under test (DUT), and sending the signal that is frequency-converted by the frequency conversion unit as a test signal of the device under test, the signal generation device including: the multiplexer (10E) according to claim 1 which receives the frequency-converted signal provided in a subsequent stage of the frequency conversion unit; and passband variable control means (151E) for driving and controlling the passband variable means to set the passband corresponding to one frequency band of the test target frequency, in which the test signal having a frequency component corresponding to one frequency band that passes through the multiplexer of the test target frequency is sent.

With this configuration, the signal generation device according to claim 10 of the present invention varies the passbands of the first filter and the second filter using the passband variable means, thereby easily and continuously varying the passbands without switching the filters, and performing high-precision DUT testing of high-frequency signals, with a simple and inexpensive structure.

In order to solve the above problem, a multiplexer control method according to claim 11 of the present invention is a multiplexer control method in a spectrum analyzer, a signal analyzer, or a signal generation device using the multiplexer (10) according to claim 1, the multiplexer control method including: a setting step (S1, S11) of setting an analysis target frequency or a test target frequency; a passband variable control step (S3, S13) of driving and controlling the passband variable means such that the passband to be selected for the first filter and the second filter is set, based on the set analysis target frequency or test target frequency; and a step (S4, S14) of extracting a frequency component corresponding to the analysis target frequency or test target frequency that passes through the first filter and the second filter which have the passband set by the passband variable means.

With this configuration, the multiplexer control method according to claim 11 of the present invention can be applied to a spectrum analyzer, a signal analyzer, or a signal generation device, and vary the passbands of the first filter and the second filter using the passband variable means, thereby easily and continuously varying the passbands without switching the filters, and performing high-precision measurement, analysis, and testing of high-frequency signals, with a simple and inexpensive structure.

Advantage of the Invention

The present invention provides a multiplexer that can easily vary the passband without switching filters and is adaptable to high-precision measurement, analysis, and testing of high-frequency signals with a simple and inexpensive structure, and a spectrum analyzer, signal analyzer, and signal generation device using the same, and a multiplexer control method.

BRIEF DESCRIPTION OF THE DRAWINGS

FIG. 4A shows the first waveguide portion, and FIG. 4B shows the second waveguide portion.

FIGS. 5A to 5E are external views of the waveguide filter in FIG. 3, FIG. 5A shows a side view, FIGS. 5B to 5D show front views when there is a gap G0, a gap G1, and a gap G2 between the first waveguide portion and the second waveguide portion, respectively, and FIG. 5E shows the configuration of a gap adjustment unit according to a modification example of a gap adjustment unit in FIG. 1.

BEST MODE FOR CARRYING OUT THE INVENTION

Embodiments of a multiplexer, a spectrum analyzer, a signal analyzer, and a signal generation device using the same, and a multiplexer control method according to the present invention will be described below.

Overview

A multiplexer 10 according to the present invention is configured using hybrid couplers which have a port P1 (Input), a port P2 (Through), a port P3 (Couple), and a port P4 (Isolated), and are configured with a circuit network that distributes or combines signals, and a filter. The multiplexer 10 receives a signal in a predetermined frequency range as an input, and extracts and outputs only signals of frequency components in a desired frequency band, while reducing unnecessary radio waves included in the input signal, that is, spurious waves. In addition, with respect to the multiplexer according to the present invention, a multiplexer, a demultiplexer, a duplexer, and the like are collectively called a multiplexer. As the hybrid coupler, for example, a branch line coupler is used, and as a filter, a band-pass filter (BPF), a high-pass filter (HPF), a low-pass filter (LPF) or the like can be used.

Figure 1:
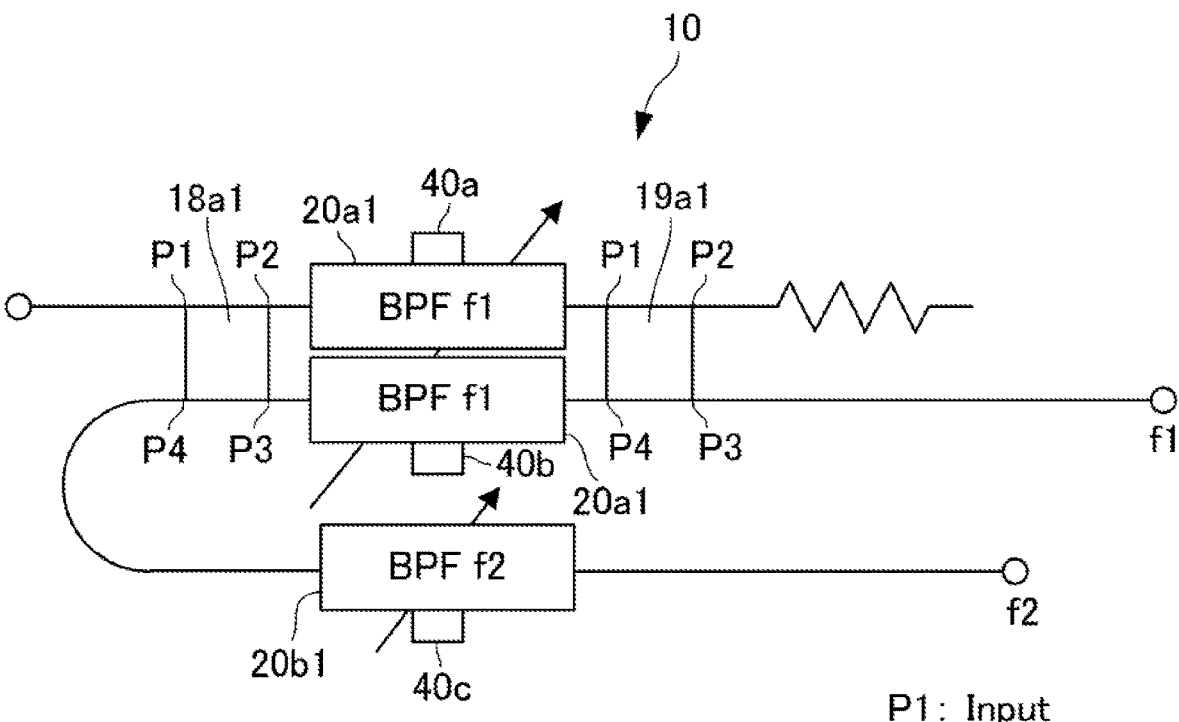
FIG. 1 is a configuration diagram of a basic unit of a multiplexer according to the present invention.

The configuration of a basic unit of the multiplexer 10 according to the present invention is shown in FIG. 1. As shown in FIG. 1, the multiplexer 10 according to the present invention includes an input-side hybrid coupler 18a1 having port P1, port P2, port P3, and port P4, an output-side hybrid coupler 19a1 having the same structure, a BPF 20a1 consisting of two filters with substantially the same characteristics connected in parallel between the hybrid coupler 18a1 and the hybrid coupler 19a1, and a BPF 20b1 connected to the port P4 of the input-side hybrid coupler 18a1. Here, it is assumed that the BPF 20a1 and the BPF 20b1 have frequency bands f1 and f2 set as passbands, respectively. The hybrid coupler 18a1 and the hybrid coupler 19a1 constitute a first hybrid coupler and a second hybrid coupler of the present invention, respectively. Further, the BPF 20a1 and the BPF 20b1 constitute a first filter and a second filter of the present invention, respectively.

The multiplexer 10 having the structure of the basic unit described above is configured to receive a signal to be measured in a predetermined frequency range from the port P1 of the input-side hybrid coupler 18a1. The predetermined frequency component is, for example, a sub-terahertz region of 100 GHz or more and less than 1 THz.

In the multiplexer 10 according to the present invention, a signal input from the port P1 of the input-side hybrid coupler 18a1 is output from the ports P2 and P3 and distributed to the two BPFs 20a1. Here, the distributed signals have equal power and are 90° out of phase. When the distributed (input) signals are in the passband f1 of the BPFs 20a1, the signals pass through the respective BPFs 20a1 and are input to the ports P1 and P4 of the output-side hybrid coupler 19a1 with their phases shifted by 90°. Both signals are combined in the output-side hybrid coupler 19a1, but at this time, the signal output from the port P2 is out of phase by a total of 180°, so the signal is cancelled out. On the other hand, since the signal output from the port P3 is in phase, the signal is output with strong power, ideally, with the same power as the input. A terminating resistor is connected to the port P2 of the hybrid coupler 19a1. This is to prevent the remaining signals from being reflected and causing adverse effects since the system is not ideal.

On the other hand, when the signal input from the port P1 of the input-side hybrid coupler 18a1 is a signal outside the passband f1 of the BPF 20a1, for example, a signal in the frequency band f2, the signal is reflected by the BPF 20a1, passes through (combined) the input-side hybrid coupler 18a1 in the opposite direction to the input direction, is output to the port P4, and is further input to the BPF 20b1. Here, since the input signal is a signal in the passband f2 of the BPF 20b1, the input signal passes through the BPF 20b1 and is output from its output terminal. In this way, the multiplexer 10 having the structure of the basic unit extracts signals of frequency components in the passbands f1 and f2 set in the BPFs 20a1 and 20b1.

Figure 2:
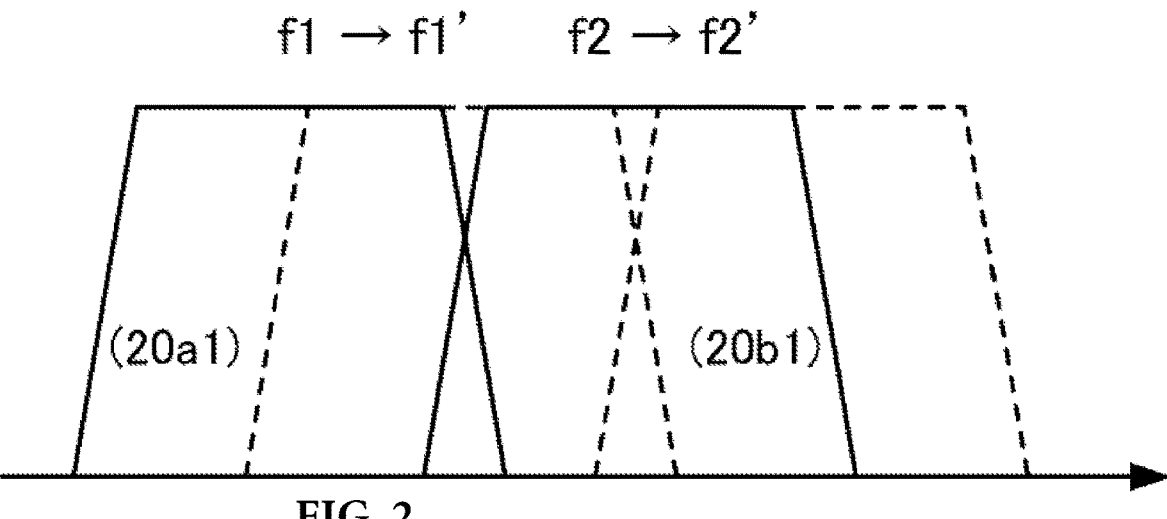
FIG. 2 is a schematic diagram showing the distribution of frequency bands that can be extracted by the multiplexer having the structure of the basic unit shown in FIG. 1.

In the multiplexer 10 having the structure of the basic unit shown in FIG. 1, the BPFs 20a1 and the BPF 20b1 have passband variable means 40a, 40b, and 40c that vary the passbands f1 and f2. The passband variable means can be implemented by a gap adjustment unit 40 and a gap adjustment mechanism 43 (see FIG. 3), or a gap adjustment unit 40A and a gap adjustment mechanism 43A (see FIG. 5A), which will be described later. Thus, as shown in FIG. 2, for example, in a situation where signals in frequency bands f1 and f2 that do not have overlapping bands are input together, the multiplexer 10 having the structure of the basic unit flexibly operates the passband by using the passband variable means 40a, 40b, and 40c in such a manner that frequency band from f1 to slightly exceeding f2 is variably set as a passband for the BPF 20a1, and the frequency band from f2 to slightly exceeding f3 is variably set as a passband (passband with overlapping bands) for the BPF 20b1.

As the BPFs 20a1 and 20b1 having the passband variable means 40a, 40b, and 40c in the multiplexer 10 having the structure of the basic unit according to the present invention, for example, a waveguide filter 20 having the configuration shown in FIGS. 3 to 5E can be used. The waveguide filter 20 will be explained in detail later.

The multiplexer 10 according to the present invention having the structure of the basic unit in which the BPFs 20a1 and 20b1 equipped with the passband variable means 40a, 40b, and 40c are arranged between the input-side hybrid coupler 18a1 and the output-side hybrid coupler 19a1, can be used in, for example, the frontend circuits 101 of a spectrum analyzer (see FIG. 11) that measures the distribution (spectrum) of frequency components included in the high-frequency signals, a signal analyzer (see FIG. 13) that analyzes the waveform of the frequency components, and a signal generation device (see FIG. 14) that generates a test signal for testing the reception sensitivity of a DUT.

According to the configuration in which the multiplexer 10 according to the present invention is provided in the frontend circuits 101 of a spectrum analyzer, signal analyzer, or signal generation device (see FIGS. 11, 13, and 14), by using the passband variable function of the above-described passband variable means 40*a*, 40*b*, and 40*c* provided in the multiplexer 10, the passband can be easily varied without switching a plurality of filters with switches, or the like, and it becomes possible to correspond to high-precision measurement, analysis and the DUT test of high-frequency signals with simple and inexpensive structure.

In the following, an embodiment (see FIGS. 3 to 5E) of a variable passband filter (that is, a waveguide filter 20 having passband variable means 40*a*, 40*b*, and 40*c*) provided in the multiplexer 10 configured with the basic unit described above, various configuration examples (see FIGS. 6 to 8) of the multiplexer 10A using a combination of basic units, an embodiment (see FIGS. 9 and 10A to 10F) of the multiplexer 10A, an embodiment (see FIGS. 11 and 12) of the spectrum analyzer 1 using the multiplexer 10A, an embodiment (see FIG. 13) of the signal analyzer 2 using the multiplexer 10A, and an embodiment (see FIGS. 14 to 16) of the signal generation device 3 using the multiplexer 10A as a multiplexer 10E will be described in order.

Variable Passband Filter Provided in Multiplexer 10

The multiplexer 10 according to the present invention has the structure as a basic unit shown in FIG. 1, and is configured to include variable passband filters such as BPFs 20*a*1 and 20*b*1 arranged between the input-side hybrid coupler 18*a*1 and the output-side hybrid coupler 19*a*1. The variable passband filter can be implemented by the waveguide filter 20, for example.

Figure 3:
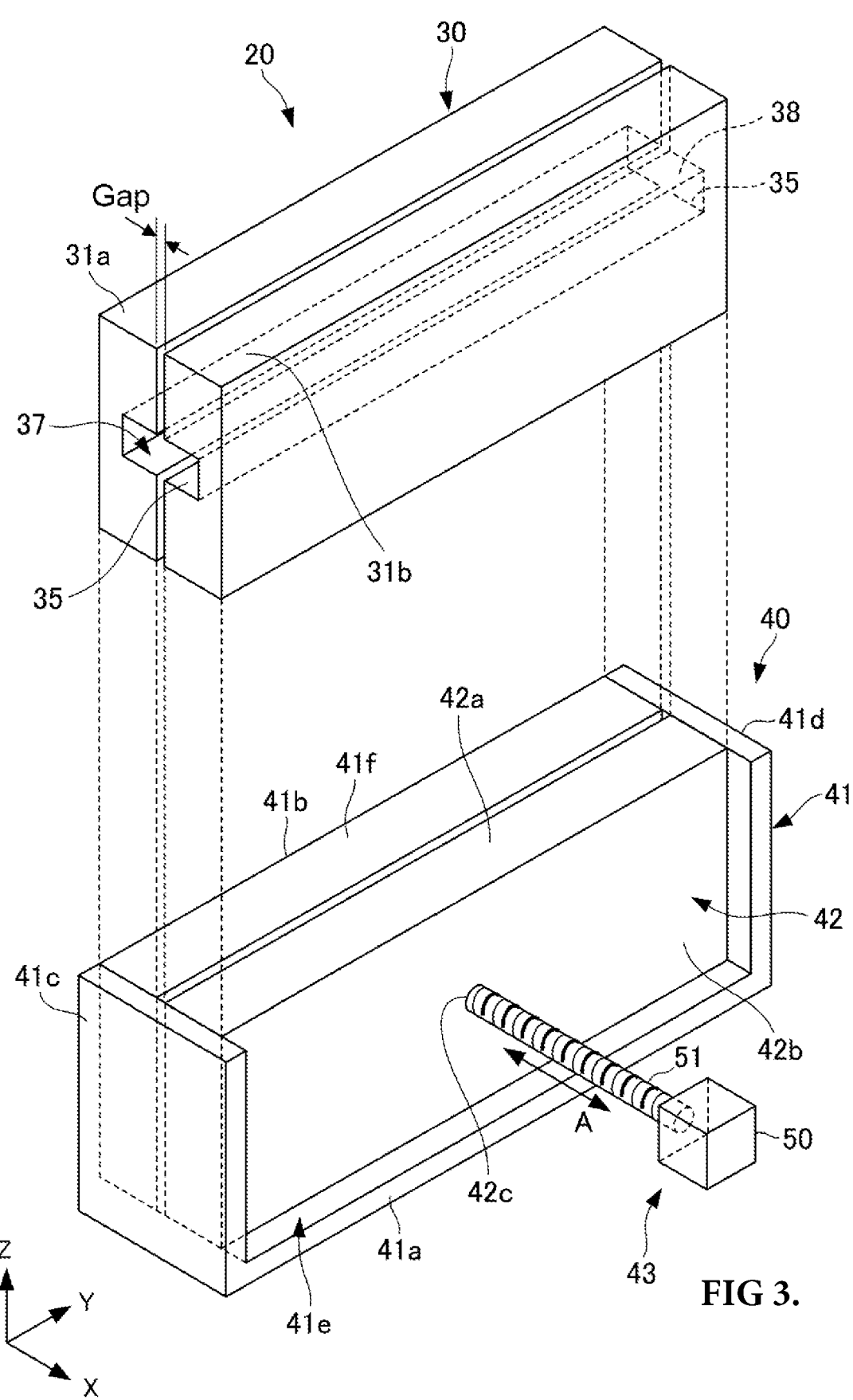
FIG. 3 is an exploded perspective view of a waveguide filter that configures a filter of the multiplexer having the structure of the basic unit shown in FIG. 1.
Figure 4A:
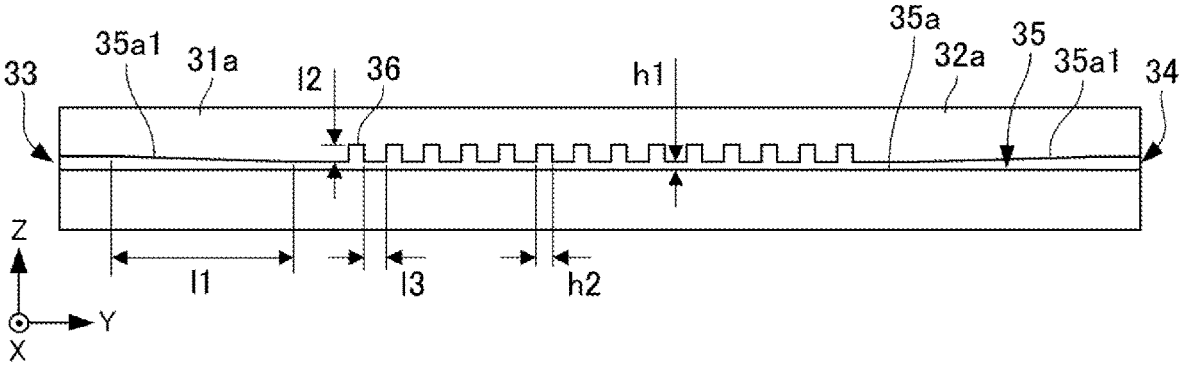
FIGS. 4A and 4B are plan views showing the inner configuration of the first waveguide portion and the second waveguide portion that configure the waveguide filter in FIG. 3.
Figure 4B:
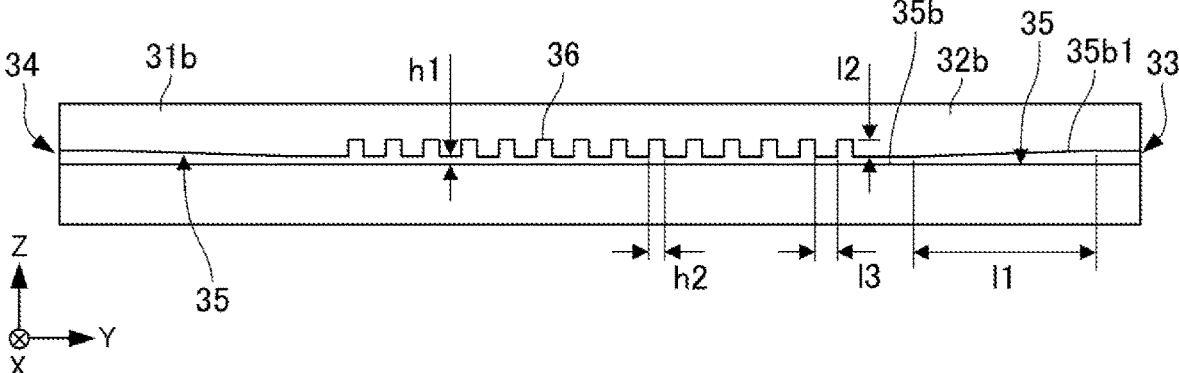

The configuration of the waveguide filter 20 provided in the multiplexer 10 as a variable passband filter will be described with reference to FIGS. 3 to 5E. FIG. 3 is an exploded perspective view of the waveguide filter 20 as a variable passband filter. FIGS. 4A and 4B are plan views showing the inner configuration of the first waveguide portion 31*a* and the second waveguide portion 31*b* that configure the waveguide filter 20 in FIG. 3, FIG. 4A shows the first waveguide portion 31*a*, and FIG. 4B shows the second waveguide portion 31*b*. The first waveguide portion 31*a* and the second waveguide portion 31*b* configure a first waveguide portion and a second waveguide portion of the present invention, respectively.

The waveguide filter 20 (corresponding to BPFs 20*a*1 and 20*b*1 in FIG. 1) included in the multiplexer 10 includes a waveguide portion 30 and a gap adjustment unit 40, as shown in FIG. 3. The waveguide portion 30 has a rectangular parallelepiped appearance as a whole that is long in one direction (Y direction), and is configured by combining a first waveguide portion 31*a* and a second waveguide portion 31*b*, each of which has the same shape. The waveguide portion 30 has a structure that complies with the standard for rectangular waveguides, for example, WR3 or WR3.4. Regarding the WR3 or WR3.4 standard, conditions are defined in which the cutoff frequency (center frequency in BPF) is 173.5 [GHz], the frequency range is 220 to 325 [GHz], the frequency band is [J band], and the inner diameter dimensions is 0.864×0.432 [mm].

The first waveguide portion 31*a* and the second waveguide portion 31*b* have structures as shown in FIGS. 4A and 4B, respectively. As shown in FIG. 4A, the first waveguide portion 31*a* has a rectangular parallelepiped shape that roughly divides the rectangular parallelepiped structure of the waveguide portion 30 into two parts in the longitudinal direction (Y direction), and a groove portion 35*a*, which is to become a waveguide path 35, is formed in one-side surface 32*a* facing the second waveguide portion 31*b* on the other side from one end portion 33 to the other end portion 34 in the longitudinal direction. In a structure in which the first waveguide portion 31*a* and the second waveguide portion 31*b* are arranged facing each other such that the one-side surface 32*a* of the first waveguide portion 31*a* and the one-side surface 32*b* of the second waveguide portion 31*b* (see FIG. 4B) face each other, the one-side surfaces 32*a* and 32*b* become a plane of symmetry (magnetic wall) when there is no gap G, and the center of both becomes the plane of symmetry when there is a gap G.

In the first waveguide portion 31*a*, the groove portion 35*a* is a groove with a rectangular cross section that is carved into the surface of one-side surface 32*a* at an appropriate depth in the X direction and an appropriate height h1 in the Z direction. The groove portion 35*a* has a uniform depth and height at the inner central portion of the first waveguide portion 31*a*. On the other hand, the groove portion 35*a* in this example has a tapered shape in which the height gradually increases from one end (the left end in the drawing) of the inner central portion of the first waveguide portion 31*a* to the front of the one end portion 33, and has a tapered shape in which the height gradually increases from the other end (the right end in the drawing) of the inner central portion to the front of the other end portion 34. In FIGS. 4A and 4B, the length of the tapered portion 35*a*1 having the above-described tapered shape of the first waveguide portion 31*a* is indicated by 11.

In the first waveguide portion 31*a*, a plurality of stub grooves 36 as branch grooves having a predetermined length (stub height h2) in the Y direction and a predetermined length (stub length 12) in the Z direction (short direction) are formed at predetermined intervals corresponding to the cavity length 13 in the Y direction, in a part of the inner central portion of the groove portion 35*a*.

Assuming that regarding the waveguide structure, the traveling direction of electromagnetic waves is called "length", the longer waveguide cross section is called "width," and the shorter waveguide cross section is called "height," as shown in FIGS. 4A and 4B, the cavities and the stubs in the first waveguide portion 31*a* and the second waveguide portion 31*b* are called differently. Regarding the first waveguide portion 31*a* and the second waveguide portion 31*b* shown in FIGS. 4A and 4B, with respect to the cavity, the traveling direction is the Y direction, and the length, width, and height are respectively the Y direction, the X direction, and the Z direction, whereas with respect to the stub, the traveling direction is the Z direction, and the length, width, and height are respectively the Z direction, the X direction, and the Y direction.

The number of stub grooves 36 formed in the groove portion 35*a* of the first waveguide portion 31*a* can be set to an arbitrary number, and each of the stub length 12, stub height h2, and interval (cavity length 13) of each stub groove 36 can also set as any value for each stub groove 36.

As shown in FIG. 4B, the second waveguide portion 31*b* on the other side configuring the waveguide portion 30 also has a rectangular parallelepiped shape that roughly divides the rectangular parallelepiped structure of the waveguide portion 30 into two parts in the longitudinal direction, and a groove portion 35*b* to become a waveguide path 35 is formed in one-side surface 32*b* facing the first waveguide portion 31*a* on the other side from one end portion 33 to the other end portion 34 in the longitudinal direction (Y direction).

In the second waveguide portion 31*b*, the arrangement structure of the groove portion 35*b* and the stub groove 36 on the one-side surface 32*b* is the same as the arrangement structure of the groove portion 35*a* and the stub groove 36 on the one-side surface 32*a* of the first waveguide portion 31*a*, except that the arrangement of each element is reversed left and right when viewed from the front with respect to the arrangement structure of the groove portion 35*a* and the stub groove 36 on the one-side surface 32*a* of the first waveguide portion 31*a* shown in FIG. 4A.

A tapered portion 35*b*1 corresponding to the tapered portion 35*a*1 extending from both ends of the second waveguide portion 31*b* to both ends (one end portion 33, the other end portion 34) of the first waveguide portion 31*a* (see FIG. 4B) is provided. The tapered portion 35*a*1 and the tapered portion 35*b*1 are determined by the cross-sectional shape of the cavity at both ends and the cross-sectional shape of the opening surface, are not limited to a structure in which the height (Z direction) gradually increases toward both ends, and may have a structure in which the height gradually decreases. For the same reason, the tapered portion 35*a*1 and the tapered portion 35*b*1 may have a structure in which not only the height but also the width (in the X direction) gradually changes (becomes wider or narrower) toward both ends.

The first waveguide portion 31*a* and the second waveguide portion 31*b* are made of aluminum, copper, or brass, for example. Further, gold plating may be applied to the entire surfaces of one-side surfaces 32*a* and 32*b* in which the groove portions 35*a* and 35*b* and the stub groove 36 are formed.

Figure 5A:
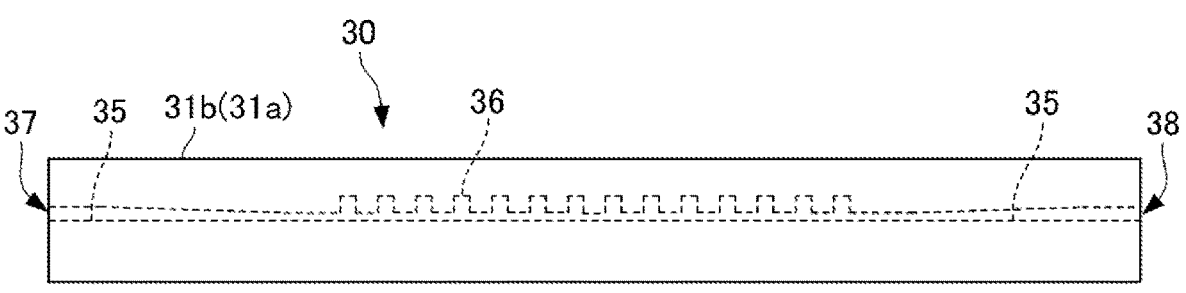

The first waveguide portion 31*a* and the second waveguide portion 31*b* shown in FIGS. 4A and 4B has an external structure as shown in FIG. 5A when viewed from the side in which the one end portions 33 and the other end portions 34 face each other, and the first waveguide portion 31*a* and the second waveguide portion 31*b* are disposed so as to face each other with the one-side surfaces 32*a* and 32*b* (when there is a gap, the intermediate surface therebetween) as a plane of symmetry (magnetic wall).

In the waveguide portion 30, the groove portion 35*a* of the first waveguide portion 31*a* and the groove portion 35*b* of the second waveguide portion 31*b* face each other to form a waveguide path 35 shown by dotted lines in FIG. 5A. In the waveguide portion 30, for example, one end portion 33 (see FIGS. 4A and 4B) of the waveguide path 35 functions as an input port 37, and the other end portion 34 (see FIGS. 4A and 4B) of the waveguide path 35 functions as an output port 38. The waveguide portion 30 is operated by being connected to other waveguide components through the input port 37 and the output port 38, respectively. The waveguide portion 30 has tapered portions 35*a*1 and 35*b*1 near both ends of the waveguide path 35, and the length thereof is set to an appropriate length in consideration of connection with the waveguide component.

The external structure of the waveguide portion 30 (see FIG. 5A) when viewed from the front when the first waveguide portion 31*a* and the second waveguide portion 31*b* are arranged facing each other is shown in FIGS. 5B, 5C, and 5D. FIG. 5B shows the structure when the first waveguide portion 31*a* and the second waveguide portion 31*b* are in contact with each other at the planes of symmetry (32*a*, 32*b*), and there is no gap G (gap=G0) between the first waveguide portion 31*a* and the second waveguide portion 31*b*. FIG. 5C shows a structure when the gap G is a gap G1 that is larger than the gap G0, and FIG. 5D shows a structure when the gap G is a gap G2 that is further larger than the gap G1. In FIGS. 5B, 5C, and 5D, the end portion of the waveguide portion 30 extending toward the front side of the drawing (paper surface) forms the input port 37, and the end portion of the waveguide portion 30 extending toward the back side of the paper surface forms the output port 38. In FIGS. 5B, 5C, and 5D, the input port 37 and the output port 38 are shown as 37 (38) for convenience.

In the multiplexer 10 as a basic unit according to the present embodiment, the waveguide portion 30 has a property that its frequency characteristics (passband) change depending on the size of the gap G between the first waveguide portion 31*a* and the second waveguide portion 31*b*. For example, in FIGS. 5A to 5E, in a case where there is no gap G between the first waveguide portion 31*a* and the second waveguide portion 31*b* (G=G0) (see FIG. 5B), the gap G is G1 (see FIG. 5C), and the gap G is G2 (see FIG. 5D), the waveguide portion 30 has a frequency characteristic in which the passband changes toward the lower side as the gap G becomes larger, that is, the gap G changes from G0 to G2. As an example, in FIGS. 5B, 5C, and 5D, it is assumed that the frequency bands f1, f2, and f3 (f1>f2>f3) are set as the passbands corresponding to the gaps G0, G1, and G2, respectively.

The multiplexer 10 as the basic unit according to the present embodiment has a structure capable of variably controlling the filter characteristics of the waveguide portion 30 by using the form (position, depth, shape, or the like) of the stub groove 36 (see FIGS. 4A and 4B) formed along with the waveguide path 35, in addition to variable control of the gap G described above. For example, in the waveguide portion 30 of the multiplexer 10 as the basic unit according to the present embodiment, as the stub length 12 of the stub groove 36 formed in the first waveguide portion 31*a* and the second waveguide portion 31*b* becomes longer, the cutoff frequency (center frequency of BPF) can be set to a low band.

Regarding the method of implementing the waveguide portion 30 used in the multiplexer 10 configured with the basic unit according to the present embodiment, for example, the structure may be designed such that when the gap G between the first waveguide portion 31*a* and the second waveguide portion 31*b* is "0 (zero), the highest frequency band is designed by using the stub length 12, the stub height h2, or the like of the stub groove 36, and then the frequency is lowered by increasing the gap G.

Returning to FIG. 3 again, the configuration of the gap adjustment unit 40 of the multiplexer 10 as the basic unit according to the present embodiment will be described.

In the multiplexer 10 shown in FIG. 3, the waveguide portion 30 has a rectangular parallelepiped appearance as a whole in which the Y direction is the longitudinal direction, the X direction is the width direction (short direction), and the Z direction is the height direction, as described above, and the first waveguide portion 31*a* and the second waveguide portion 31*b* have a configuration in which the gap G therebetween can be variably controlled by the gap adjustment unit 40.

The gap adjustment unit 40 of the waveguide portion 30 includes, for example, a first stage 41, a second stage 42, and a gap adjustment mechanism 43, as shown in FIG. 3. The first stage 41 includes a base portion 41*a*, a stage main portion 41*b*, and side walls 41*c* and 41*d* provided on both left and right sides, and a second stage housing portion 41*e* surrounded by the base portion 41*a*, the stage main portion 41*b*, and the side walls 41*c* and 41*d* is formed. Here, the stage main portion 41*b* has an upper surface 41*f* having a planar shape equivalent to the bottom surface of the first waveguide portion 31*a* of the waveguide portion 30. The first waveguide portion 31*a* is fixed to the upper surface 41*f* of the stage main portion 41*b* by its lower surface.

The second stage 42 has an upper surface 42*a* having a planar shape equivalent to the lower surface of the second waveguide portion 31*b* of the waveguide portion 30. The second stage 42 has a length in the Y direction that is slightly shorter than the distance between the side walls 41*c* and 41*d* that configure the second stage housing portion 41*e* of the first stage 41, and is housed in such a way that movement inside the second stage housing portion 41*e* in the Y direction is restricted and movement in the X direction is permitted.

Here, the second stage 42 is housed in the second stage housing portion 41*e* of the first stage 41 so as to be movable in both forward and backward direction (direction of arrow A) in the short direction (X direction) while keeping parallel to the stage main portion 41*b* of the first stage 41 in the longitudinal direction (Y direction). In the second stage 42, a screw hole 42*c* which penetrates in the X direction and is screwed into the screw body 51 of the gap adjustment mechanism 43 formed near the center of the side surface 42*b* on the opposite side from the first stage 41. The second waveguide portion 31*b* is fixed to the upper surface 42*a* of the second stage 42 by its lower surface.

The gap adjustment mechanism 43 includes a motor 50 that is fixedly attached, and a screw body 51 that extends in the X direction, is screwed into the screw hole 42*c* formed in the side surface 42*b* of the second stage 42, and is rotated by the motor 50.

The gap adjustment mechanism 43 rotationally drives the screw body 51 in one direction or the opposite direction by the motor 50, so that the second stage 42, which is screwed into the screw body 51 through the screw hole 42*c*, can be moved forward or backward in the X direction (in the direction of arrow A). Due to the movement of the second stage 42, the second waveguide portion 31*b* fixed to the upper surface 42*a* of the second stage 42 is moved in the direction of arrow A with respect to the first waveguide portion 31*a* while keeping the planes of symmetry (one-side surfaces 32*a*, 32*b*) parallel. Thereby, the first waveguide portion 31*a* and the second waveguide portion 31*b* can appropriately vary and control the size of the gap G therebetween while maintaining their parallelism.

The multiplexer 10 as the basic unit according to the present embodiment is a single waveguide structure, and can implement, for example, the function of a waveguide-type BPF (see FIG. 2) in which each passband within the frequency range from f1 to f2' can be set as desired, by rotationally driving the screw body 51 of the gap adjustment mechanism 43 by using the motors 50, and variably controlling the gap G between the first waveguide portion 31*a* and the second waveguide portion 31*b* of the waveguide portion 30 to become, for example, G0, G1, or G2.

In FIG. 3, an example is shown in which the gap adjustment unit 40 has a structure in which the first stage 41 is fixed and the second stage 42 is moved, but the structure is not limited to this, and a gap adjustment unit 40A according to a modification example having a structure in which both the first stage and the second stage are moved may be used.

Figure 5E:
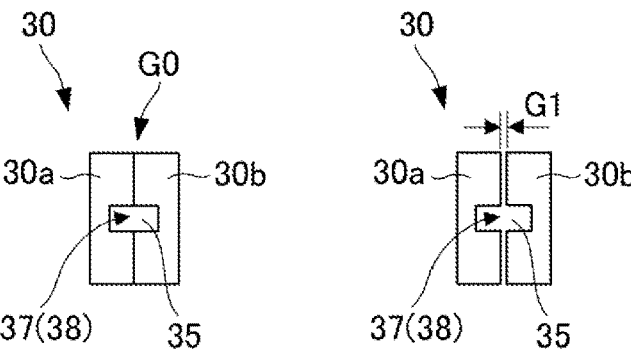
Figure 5E:
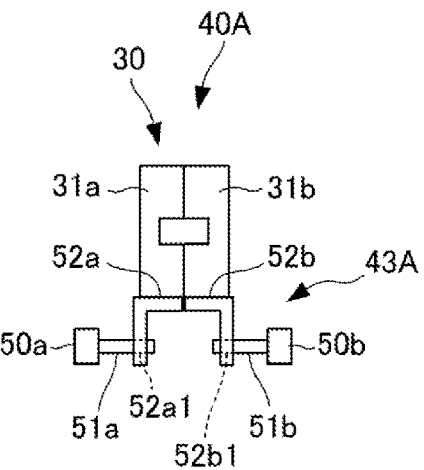

A schematic configuration of the gap adjustment unit 40A according to the modification example is shown in FIG. 5E. As shown in FIG. 5E, the gap adjustment unit 40A according to the modification example includes a first stage 52*a* and a second stage 52*b* mounted in a state where the first waveguide portion 31*a* and the second waveguide portion 31*b* of the waveguide filter 20 are arranged opposite to each other, and motors 50*a* and 50*b* that rotationally drive screw bodies 51*a* and 51*b* so as to move the first stage 52*a* and the second stage 52*b* back and forth in the direction perpendicular to the longitudinal direction of the waveguide portion 30 such that the gap G between the first waveguide portion 31*a* and the second waveguide portion 31*b* changes, and screw holes 52*a*1 and 52*b*1 to be screwed into the screw bodies 51*a* and 51*b* are formed on the one-side surfaces of the first stage 52*a* and the second stage 52*b*, respectively.

By providing the gap adjustment unit 40A having the above configuration in the waveguide filter 20, the waveguide filter 20 can easily and continuously vary the gap G between the first waveguide portion 31*a* and the second waveguide portion 31*b* by moving simultaneously the first stage 52*a* and the second stage 52*b* in the direction in which the first stage 52*a* and the second stage 52*b* approach or move away by the motors 50*a* and 50*b* (moving the first stage 52*a* and the second stage 52*b* symmetrically with respect to the plane of symmetry). Furthermore, by employing the gap adjustment unit 40A that can move the first stage 52*a* and the second stage 52*b* symmetrically with respect to the plane of symmetry, the waveguide filter obtains 20 better filter characteristics than when using the gap adjustment unit 40 (see FIG. 3) in which the first stage 41 is fixed and the second stage 42 is moved.

The motors 50*a* and 50*b* described above configure the drive means of the present invention. Further, the first stage 52*a* and the second stage 52*b* configure a first stage member and a second stage member of the present invention, respectively.

As described above, the multiplexer 10 as the basic unit shown in FIG. 1 can be implemented as a structure for varying the passband, by using the waveguide filter 20 equipped with the gap adjustment unit 40 or the gap adjustment unit 40A illustrated in FIGS. 3 to 5E as the BPFs 20*a*1 and 20*b*1.

Further, the multiplexer having a structure that varies the passband according to the present invention is not limited to the configuration of the basic unit shown in FIG. 1, and can also achieve desired filter characteristics by combining the basic units or units deformed from the basic unit in a various manner.

Figure 6:
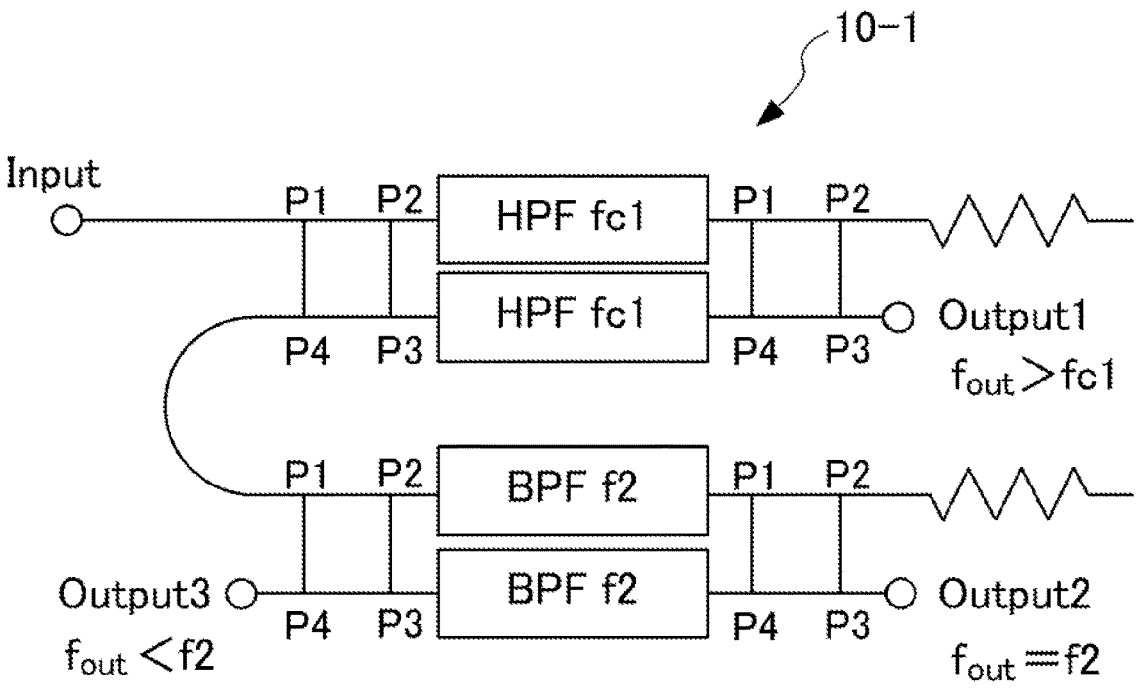
FIG. 6 is a diagram showing a configuration example of the multiplexer according to the present invention using the basic unit shown in FIG. 1.
Figure 7:
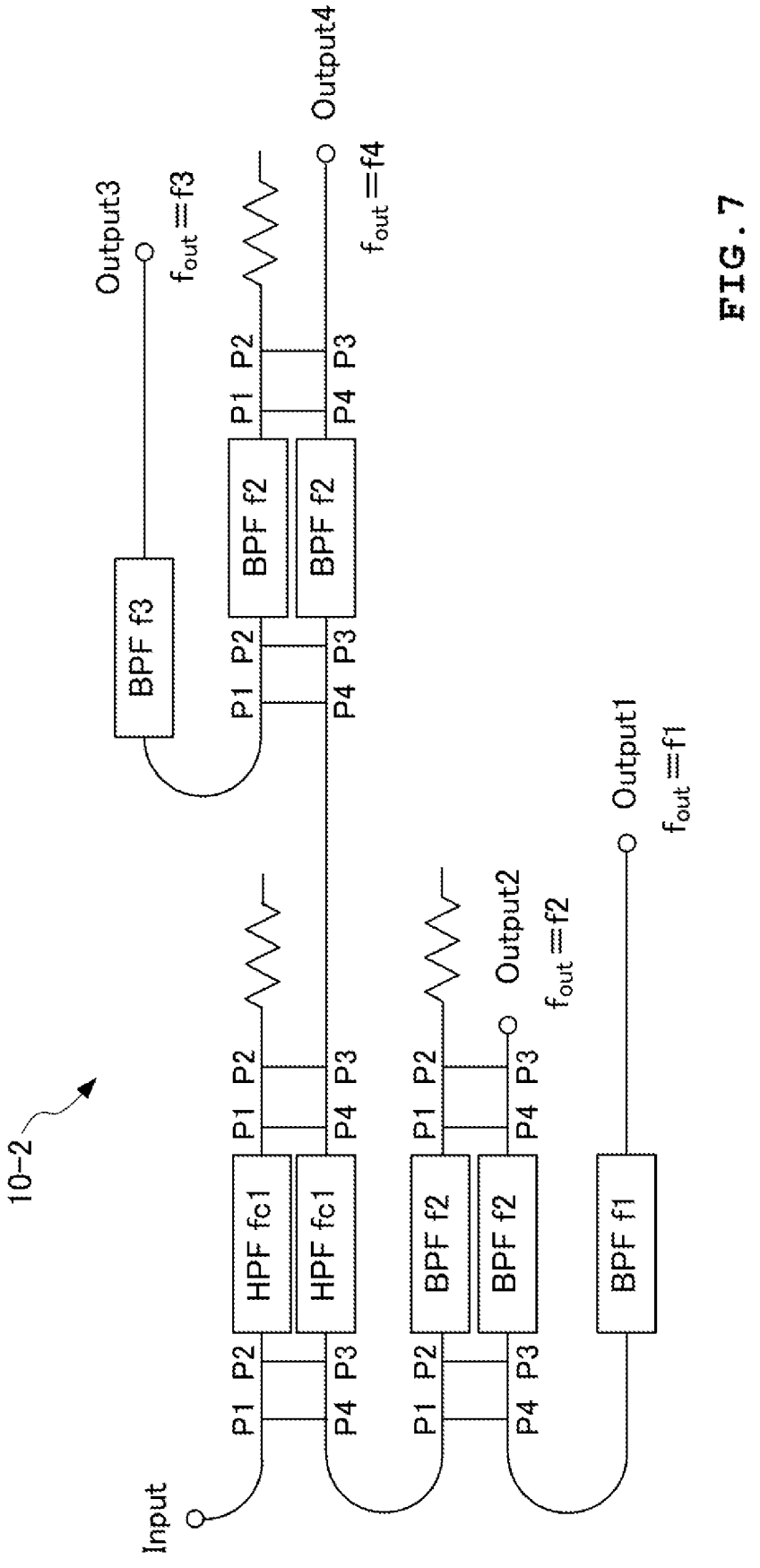
FIG. 7 is a diagram showing another configuration example of the multiplexer according to the present invention using the basic unit shown in FIG. 1.
Figure 8:
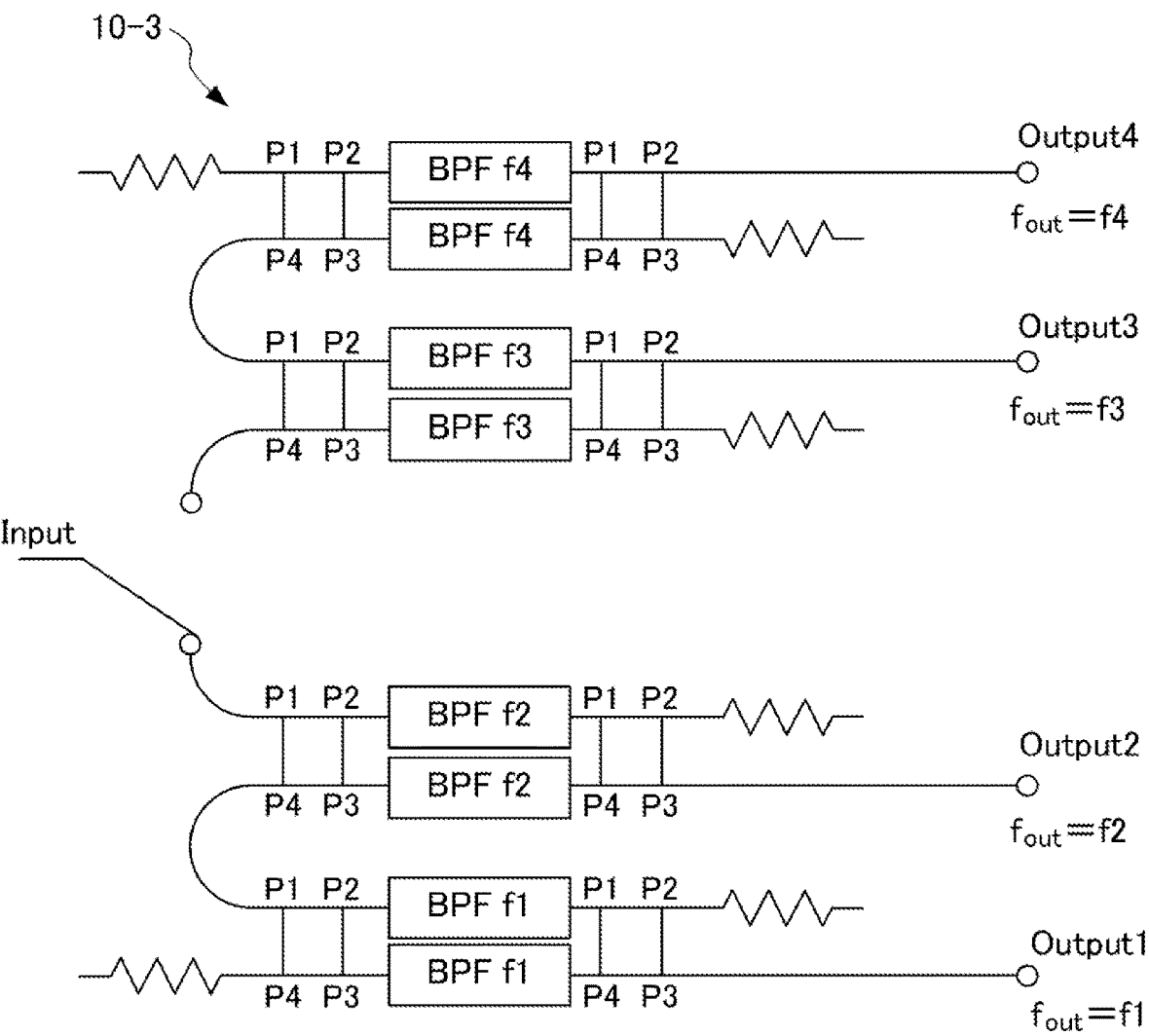
FIG. 8 is a diagram showing still another configuration example of the multiplexer according to the present invention using the basic unit shown in FIG. 1.

Examples of configurations of multiplexers 10-1, 10-2, and 10-3 based on the combinations of the basic units are shown in FIGS. 6 to 8. All of the multiplexers 10-1, 10-2, and 10-3 have the configuration of the basic unit described above, that is, a part in which filters such as a BPF or an HPF (an LPF can also be used) are arranged between two hybrid couplers such as a BLC. The multiplexer 10-1 shown in FIG. 6 is configured with an HPF with a cutoff frequency fc1 (passband is a higher frequency than fc1), and a BPF with a passband f2 (where f2<fc1). In the multiplexer 10-1, when the frequency of the signal input from the Input port is in the passband of the HPF (higher than fc1), the signal passes through the HPF and appears at the Couple port of the subsequent BLC, so that a signal with a frequency of fout>fc1 is extracted from the Output1 port. When the frequency of the signal input from the Input port is lower than fc1, the signal is reflected and input to the BPF from the Isolated port in the previous stage of the HPF via the Input port in the previous stage of the BPF. When the signal frequency is within the passband (f2) of the BPF, the signal appears at the Couple port in the subsequent stage of the BPF as above, and the signal of fout=f2 is extracted from the Output2 port. Further, when the signal is lower than f2, the signal outside the BPF band is reflected and appears at the Isolated port of the previous stage. Therefore, a signal with fout<f2 is extracted from the Output3 port. As described above, according to the configuration of multiplexer 10-1, the input signal is divided into three frequency bands and extracted.

The multiplexer 10-2 shown in FIG. 7 extracts the frequencies of the signals input from the Input port through passbands (f1, f2, f3, and f4) characterized by four BPFs, and outputs the extracted signal from each port. As shown in FIG. 7, the multiplexer 10-2 is composed of four BPFs with passbands f1, f2, f3, and f4 and an HPF with a cutoff frequency fc1 (the passband is frequencies higher than fc1), and it is assumed that f1<f2<fc1<f3<f4. When the signal input from the Input port is higher than fc1, the signal passes through the HPF, and when the signal is within the band of f4, the signal passes through the BPF of f4 and is output from the Output4. When the signal is outside the f4 band, the signal is reflected, and the signal within the f3 band passes through the BPF of f3 and is output from the Output3. Similarly, when the input signal is lower than fc1, the signal within the band f1 is extracted from Output1, and the signal within band f2 is extracted from Output2 and output.

As an example of the combination of a plurality of basic units, a configuration in which a plurality of basic units (two in this example) are switched by a switch or the like, such as a multiplexer 10-3 shown in FIG. 8, may also be used. In the multiplexer 10-3, signals of frequencies corresponding to the passbands of the respective BPFs are extracted and output from the four Output ports. In this configuration, overlap between f1 and f2 and overlap between f3 and f4 are not allowed, but overlaps with other units (for example, f1 and f3, f2 and f4, f1 and f4, or the like) are allowed.

In the example shown in FIG. 8, a switch is used to switch the basic units, but the configuration is not limited to this, and a configuration in which branching is performed using a power divider, directional coupler, or the like may be used.

In the present invention, multiplexer configurations other than the configurations shown in FIGS. 6 to 8 can also be used. In either case, for example, with a configuration including the first hybrid coupler (hybrid coupler 18a1 in FIG. 1), the second hybrid coupler (hybrid coupler 19a1 in FIG. 1), the first filter (BPF 20a1 in FIG. 1), and the second filter (BPF 20b1 in FIG. 1) as a basic unit, the plurality of basic units are connected in order such that the port P1 of the first hybrid coupler of the subsequent basic unit is connected to the port P4 of the first hybrid coupler of the previous basic unit or the port P3 of the second hybrid coupler, and the first filters and the second filters of the previous and subsequent basic units vary the passband such that overlapping bands are formed through continuous bands. Here, the first filter and the second filter of each basic unit can be configured with any one type or a mixture of a plurality of types of a BPF, a HPF, and an LPF.

Figure 9:
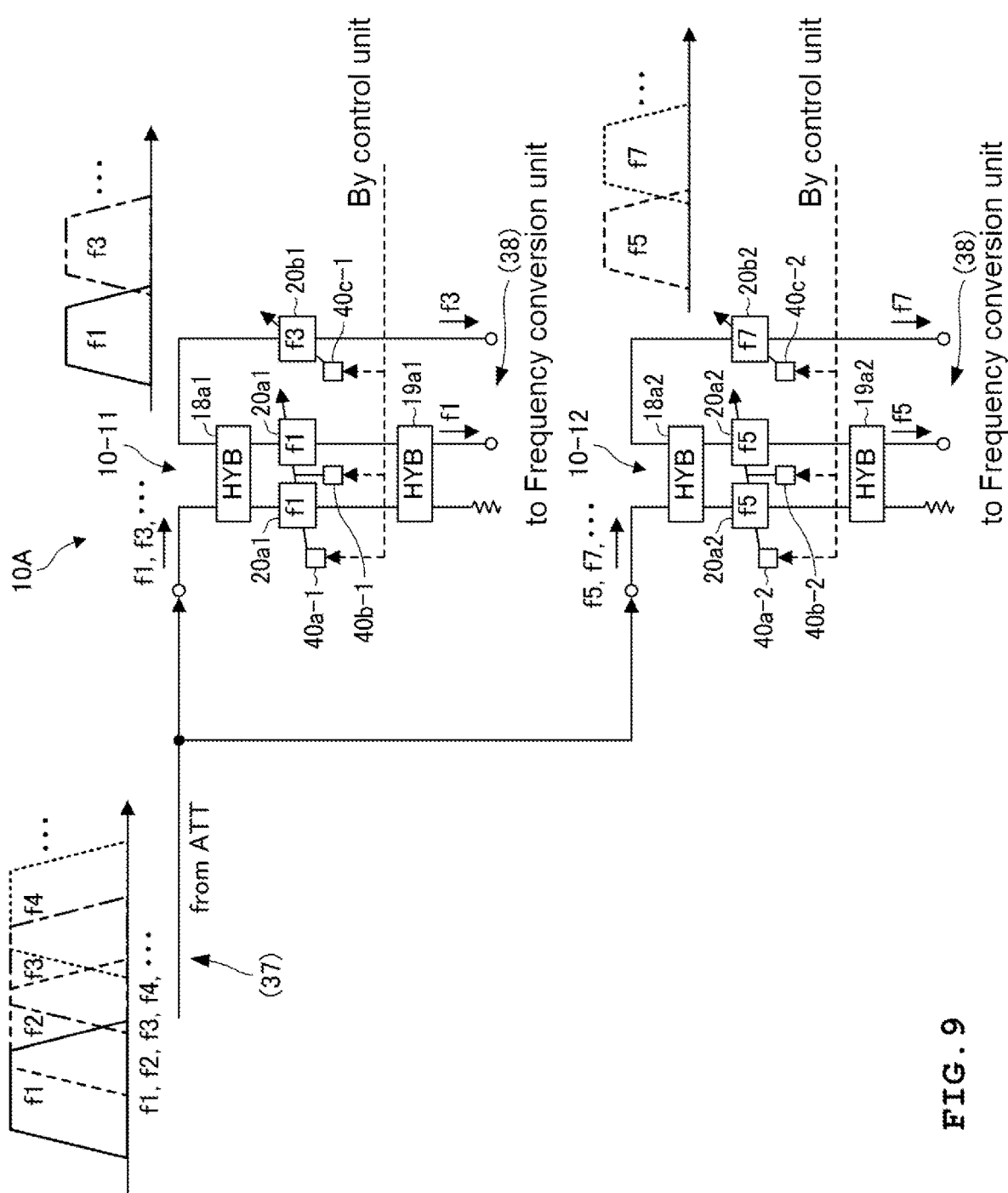
FIG. 9 is a diagram showing a configuration of the multiplexer according to the embodiment of the present invention other than the configurations shown in FIGS. 6 to 8 using a plurality of the basic units shown in FIG. 1.

Next, embodiments of a multiplexer other than the configurations shown in FIGS. 6 to 8 based on the multiplexer 10 (basic unit) shown in FIG. 1 will be described with reference to FIGS. 9 and 10A to 10F. This embodiment relates to a multiplexer 10A in which a plurality of basic units (in this example, two basic units) that can select adjacent frequency ranges are combined and which can operate with a wider frequency range (see FIG. 10F) as a selection target, as compared to the frequency range when there is only one basic unit (see FIG. 2). This multiplexer 10A is intended to be used, for example, in the spectrum analyzer 1 (see FIG. 11), and as shown in FIG. 9, it has a configuration including multiplexers 10-11 and 10-12 which are basic units (see FIG. 1).

In the multiplexer 10A according to an embodiment of the present invention, multiplexer 10-11 on one side includes, as described with reference to FIG. 1, an input-side hybrid coupler 18a1 having port P1, port P2, port P3, and port P4, an output-side hybrid coupler 19a1 having the same structure, a BPF 20a1 consisting of two filters with substantially the same characteristics connected in parallel between the hybrid coupler 18a1 and the hybrid coupler 19a1, and a BPF 20b1 connected to the port P4 of the input-side hybrid coupler 18a1. Here, it is assumed that the BPF 20a1 and the BPF 20b1 have frequency bands f1 and f3 (see FIGS. 10B and 10C) set as initial setting (default) passbands, respectively.

The multiplexer 10-12 on the other side includes an input-side hybrid coupler 18a2 having port P1, port P2, port P3, and port P4, an output-side hybrid coupler 19a2 having the same structure, a BPF 20a2 consisting of two filters with substantially the same characteristics connected in parallel between the hybrid coupler 18a2 and the hybrid coupler 19a2, and a BPF 20b2 connected to the port P4 of the input-side hybrid coupler 18a2. Here, it is assumed that frequency bands f5 and f7 (see FIGS. 10D and 10E) are set as default passbands for the BPF 20a2 and the BPF 20b2, respectively.

In the multiplexer 10A, the hybrid couplers 18a1 and 19a1 of the multiplexer 10-11 and the hybrid couplers 18a2 and 19a2 of the multiplexer 10-12 have the same function, respectively. Further, the only difference between the BPF 20a1 and BPF 20b1 of the multiplexer 10-11 and the BPF 20a2 and BPF 20b2 of the multiplexer 10-12 is the compatible filter characteristics (passband).

Figures 10A, 10B, 10C, 10D, 10E, 10F:
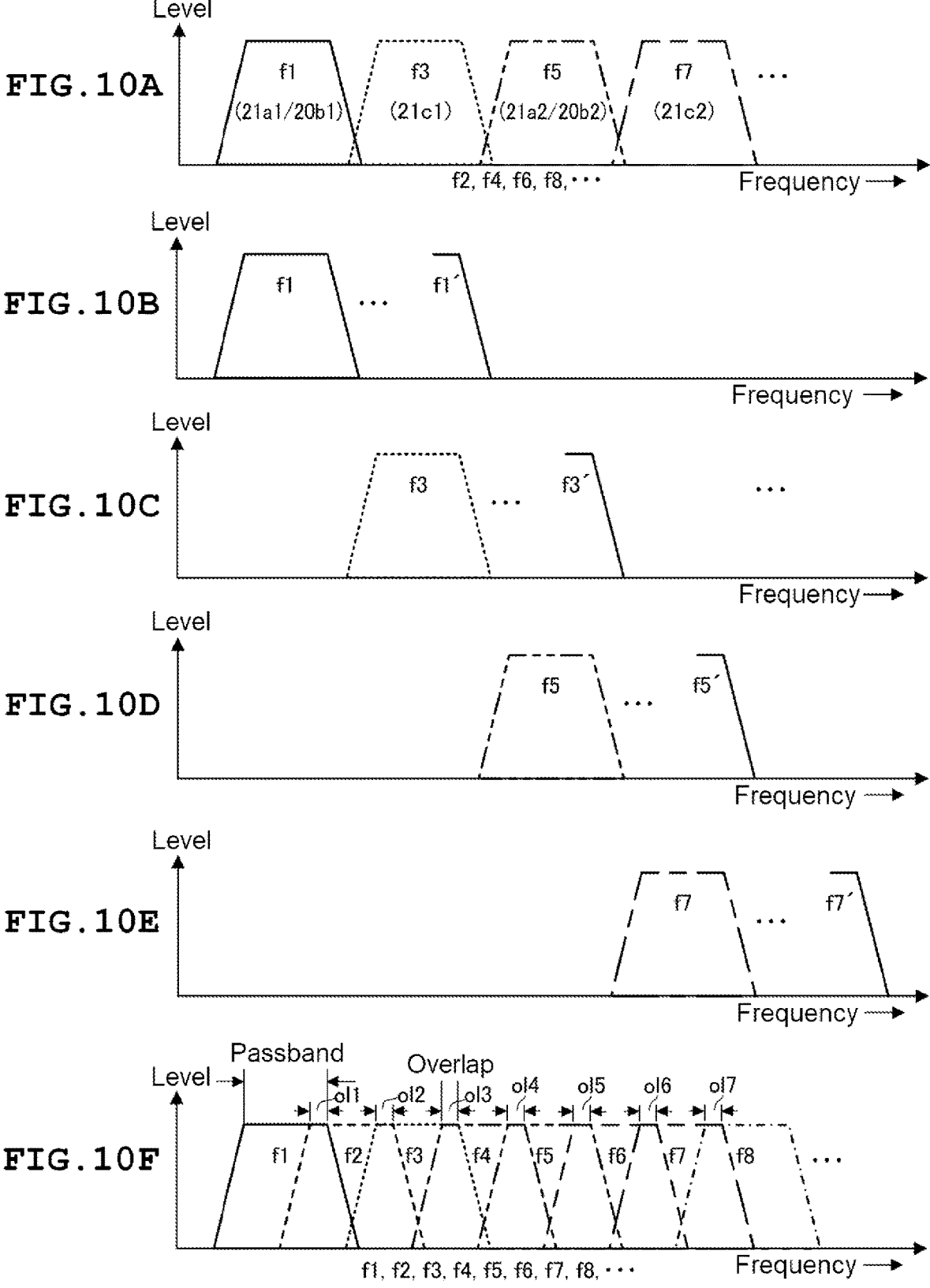
FIGS. 10A to 10F are schematic diagrams distribution of passbands based on variable passband control in a variable passband filter in the multiplexer according to the embodiment of the present invention.

Regarding the passband, the frequency bands f1 and f3 to be selected by the BPF 20a1 and BPF 20b1 of the multiplexer 10-11 in the default settings do not have overlapping bands, for example, as shown in FIG. 10A. Similarly, the frequency bands f5 and f7 that are selected by the BPF 20a2 and BPF 20b2 of the multiplexer 10-12 in the default settings do not have overlapping bands.

Here, the BPF 20a1 and BPF 20b1 of the multiplexer 10-11 have passband variable means 40a-1 and 40b-1 and passband variable means 40c-1, respectively. Due to the passband variable function of these passband variable means 40a-1, 40b-1, and 40c-1, the multiplexer 10-11 can change the passband from f1 to f1' (=f2) and from f3 to f3' (=f4), for example, as shown in FIGS. 10B and 10C, according to the size of the gap G in the waveguide portion 30.

Further, the BPF 20a2 and BPF 20b2 of the multiplexer 10-12 have passband variable means 40a-2 and 40b-2 and passband variable means 40c-2, respectively. Due to the passband variable function of these passband variable means 40a-2, 40b-2, and 40c-2, the multiplexer 10-12 can change the passband from f5 to f5' (=f6) and from f7 to f7' (=f8), for example, as shown in FIGS. 10D and 10E, according to the size of the gap G in the waveguide portion 30.

Therefore, in the entire multiplexer 10A including the multiplexers 10-11 and 10-12, as shown in FIG. 10F, eight passbands f1 to f8 having bands ol1, ol2, ol3, ol4, ol5, ol6, and ol7 that overlap with each other can be variably controlled.

Spectrum Analyzer Using Multiplexer 10A

Figure 11:
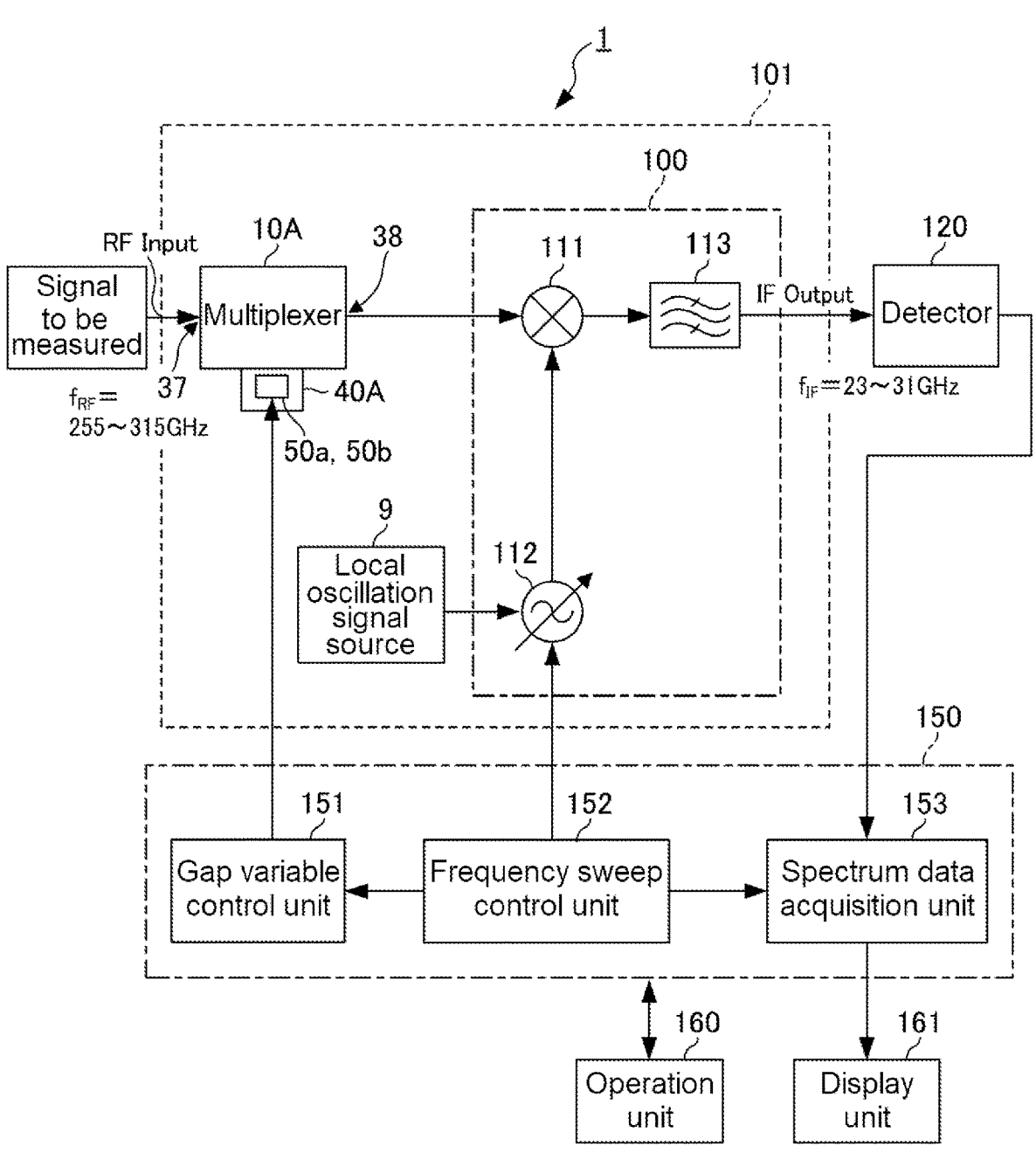
FIG. 11 is a diagram showing a general configuration of a spectrum analyzer using the multiplexer according to the embodiment of the present invention.

Next, an example of application of the multiplexer 10A according to the present embodiment to the spectrum analyzer 1 will be described. FIG. 11 is a diagram showing a general configuration of a spectrum analyzer 1 using the multiplexer 10A. The spectrum analyzer 1 is assumed to have a millimeter wave band signal analysis function.

The spectrum analyzer 1 according to the present embodiment includes a frequency conversion unit 100, a detector 120, a control unit 150, an operation unit 160, and a display unit 161, and also includes the multiplexer 10A having the above-described configuration in a previous stage of the frequency conversion unit 100. The multiplexer 10A is disposed such that the input port 37 can receive a signal to be measured as RF input, and the output port 38 can send an output signal to the input side of the frequency conversion unit 100 (see FIG. 9).

The frequency conversion unit 100 includes a mixer 111, a local signal generator 112, and a filter 113.

The mixer 111 is a functional unit as frequency conversion means for mixing the signal of each frequency component (RF frequency) in which spurious waves output from the multiplexer 10A are reduced and the local signal input from the local signal generator 112, and converting the signal to be measured from an RF frequency signal into an intermediate frequency signal (IF frequency) and outputting the signal.

The local signal generator 112 generates a local signal to be sent to the mixer 111, based on a local signal (reference signal) input from local oscillation signal source 9.

The filter 113 is a filter functional unit that receives the IF signal frequency-converted by the mixer 111, passes only signals of frequency components of a preset band of the input IF signal, and inputs the signals to the detector 120.

The detector 120 is a processing circuit that detects the strength of the signal (IF) in each band that passes through the filter 113 and is input.

The control unit 150 has a control function for comprehensively controlling the entire spectrum analyzer 1 including the multiplexer 10, as well as a gap variable control unit 151, a frequency sweep control unit 152, and a spectrum data acquisition unit 153. The control unit 150 may be a control unit of the main body of the spectrum analyzer 1, or may be configured with a separate device such as a personal computer (PC).

The gap variable control unit 151 is a functional unit that variably adjusts the gap G between the first waveguide portion 31a and the second waveguide portion 31b of the multiplexer 10A within the range of G0 to G2 (see FIGS. 5B, 5C, and 5D), for example, by rotationally driving the motors 50a and 50b of the gap adjustment mechanism 43A (see FIG. 5E) of the multiplexer 10A in one direction or in the opposite direction for the passband variable means 40a-1, 40b-1, 40c-1, and the passband variable means 40a-2, 40b-2, and 40c-2, respectively. The gap variable control unit 151 configures the passband variable control means of the present invention together with gap variable control units 151D and 151E, which will be described later.

The frequency sweep control unit 152 is a functional unit that executes frequency sweep control for changing the frequency of the local signal output from the local signal generator 112 to the mixer 111 within a designated frequency range based on the local signal (reference signal) input from the local oscillation signal source 9.

The spectrum data acquisition unit 153 is a unit that acquires spectrum data including the strength of a signal component of a desired frequency band within the analysis target frequency range detected by the detector 120, and performs display control on the display unit 161, or the like.

The operation unit 160 has input means such as various keys, switches, buttons, or the like, and is operated by the user when making various settings related to measurement of the signal to be measured. The display unit 161 is configured with, for example, a liquid crystal display, and is a functional unit that displays a setting screen, measurement results, or the like related to the measurement of the signal to be measured.

In the spectrum analyzer 1 shown in FIG. 11, a signal to be measured (input signal) in the millimeter wave band is given to the mixer 111 of the frequency conversion unit 100 through the multiplexer 10A, and is mixed with the local signal output from the local signal generator 112, and a signal in a predetermined intermediate (IF) frequency band from is extracted from the mixed output by the filter 113. The frequency of the local signal is swept and varied by the frequency sweep control unit 152 of the control unit 150 in accordance with a desired analysis target frequency range, and the signal component in the desired analysis target frequency range is extracted as a signal in the intermediate frequency band over time, and the strength of the signal is detected by the detector 120.

In addition, in order to simplify the explanation, an example is shown here in which the frequency conversion process (heterodyne conversion) of the frequency conversion unit 100 is performed only once, but in order to accurately analyze a signal of a high frequency such as a millimeter wave band, a frequency conversion process is performed a plurality of times to convert the signal into a signal in an intermediate frequency band that can be digitally processed.

In the control unit 150, the spectrum data acquisition unit 153 stores, as spectrum data, the signal strength detected for each analysis target frequency by the detector 120, according to the analysis target frequency set by the operation unit 160, for example, and displays the spectrum data on the display unit 161.

The gap variable control unit 151 rotationally drives the motors 50a and 50b of the gap adjustment mechanism 43A (see FIG. 5E) for the passband variable means 40a-1, 40b-1, and 40c-1, and the passband variable means 40a-2, 40b-2, and 40c-2 of the multiplexer 10A, respectively, according to an analysis target frequency that is set in advance, and variably controls the gap G between the first waveguide portion 31a and the second waveguide portion 31b of the multiplexer 10A so as to have a value corresponding to a desired passband within the analysis target frequency range.

The frequency sweep control unit 152 executes sweep control of the frequency corresponding to the passband set for the multiplexer 10A via variable control of the gap G by the gap variable control unit 151.

In the configuration of the spectrum analyzer 1 shown in FIG. 11, the signal to be measured as the input signal (RF Input) to the input port 37 of the multiplexer 10A is, for example, a signal (fRF) in the frequency range of 255 to 315 GHz, and the output signal (IF Output) from the output port 38 is a signal (fIF) in the frequency range of 23 to 31 GHz, for example. That is, the spectrum analyzer 1 according to the present embodiment receives the reception signals from, for example, a mobile phone (5G, LTE, XG-PHS, W-CDMA, CDMA2000, GSM, or the like) or various wireless communications (WLAN, Bluetooth, GPS, ISDBT, or the like) as an input signal (RF input), and can measure the spectral characteristics of a desired frequency component after reducing spurious waves by the multiplexer 10A in the frontend circuit.

Next, the signal measurement control operation of the spectrum analyzer 1 according to the present embodiment will be described with reference to the flowchart shown in FIG. 12.

In this example, the spectrum analyzer 1 using the multiplexer 10A can measure the spectral characteristics, by inputting a signal to be measured from the input port 37 to the multiplexer 10A, extracting from the signal to be measured, by the multiplexer 10A, a signal in a desired frequency band set in advance, for example, any one of the frequency bands f1, f2, f3, f4, f5, f6, f7, and f8 in order, and outputting the extracted signals to the output port 38.

In order to perform the above measurement, the user performs an operation to set the sweep frequency range (analysis target frequency range) of the spectrum analyzer 1, for example, on the operation unit 160 (step S1). Examples of the parameters set here include the center frequency and sweep frequency span, start frequency and stop frequency, start frequency and sweep frequency span, or the like of each of the frequency bands f1, f2, f3, f4, f5, f6, f7, and f8.

Next, the control unit 150 calculates the passbands (any one of frequency bands f1, f2, f3, f4, f5, f6, f7, f8 (see FIGS. 10A to 10F) to be selected for the multiplexer 10 and local frequency (LO) setting conditions (LO setting), based on the sweep frequency range set in step S1 (step S2).

Subsequently, the gap variable control unit 151 adjusts and controls the gap G between the first waveguide portion 31*a* and the second waveguide portion 31*b* of each of the multiplexers 10-11 and 10-12 configuring the multiplexer 10A to be the gap G corresponding to the passband calculated in step S2, for example, any one of G0, G1, and G2 (see FIGS. 5B, 5C, and 5D) (step S3). At this time, the gap variable control unit 151 sends a control signal (gap adjustment control signal) corresponding to the calculated passband to the motors 50*a* and 50*b* of the gap adjustment mechanism 43A, for the passband variable means 40*a*-1, 40*b*-1, and 40*c*-1 and the passband variable means 40*a*-2, 40*b*-2, and 40*c*-2, and rotationally drives the motors 50*a* and 50*b* until the gap G becomes the value corresponding to the calculated passband. Further, in step S3, control is also performed to set a local frequency based on the LO setting calculated in step S2, for frequency conversion in the frequency conversion unit 100.

After completing the adjustment control of the gap G and the local frequency setting in step S3, the control unit 150 inputs the frequency component corresponding to the adjusted gap G passing through the waveguide path 35 of the multiplexer 10A from the output port 38 to the frequency conversion unit 100 to perform frequency conversion, and inputs the frequency-converted signal to the detector 120 (step S4).

Further, the control unit 150 controls the detector 120 to measure the spectral characteristics of the signal of the frequency component (desired frequency band that has passed through the multiplexer 10A) after frequency conversion by the frequency conversion unit 100 (step S5). Here, the spectrum data acquisition unit 153 executes a spectrum display control of acquiring spectrum data including the strength of the signal component in any one of the desired frequency bands f1, f2, f3, f4, f5, f6, f7, and f8 detected by the detector 120, and displaying the spectrum data on the display unit 161.

Figure 12:
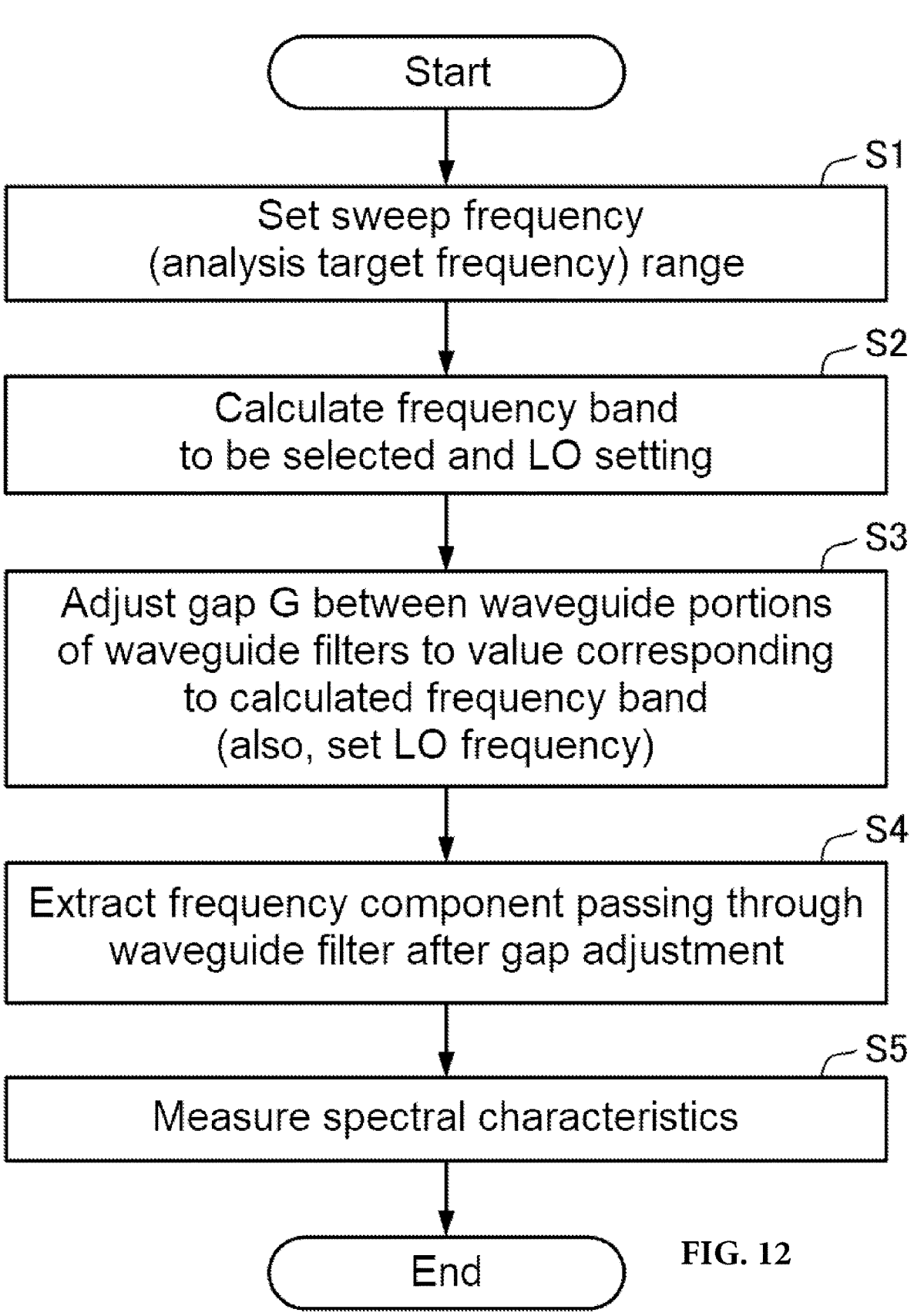
FIG. 12 is a flowchart showing a signal measurement control operation of the spectrum analyzer using the multiplexer according to the embodiment of the present invention.

During execution of a series of signal measurement operations shown in FIG. 12, in a case where there is one passband (frequency band) to be selected in step S2, the signal measurement operation ends after each process of adjusting the gap G in step S3, frequency conversion in step S4, and measuring spectral characteristics in step S5 is executed. Further, in a case where there are a plurality of passbands to be set in step S2, the signal measurement operation ends after repeatedly executing the processes in steps S3, S4, and S5 for each passband.

A modification example of the spectrum analyzer 1 according to the present embodiment may also be configured to use the multiplexer 10 (see FIG. 1) having the configuration of the basic unit, instead of the multiplexer 10A shown in FIG. 9. Further, the gap adjustment mechanism 43 (see FIG. 3) may be used instead of the gap adjustment mechanism 43A.

The spectrum analyzer 1 according to the modification example using the multiplexer 10 can measure the spectral characteristics, by inputting a signal to be measured to the multiplexer 10, and extracting from the signal to be measured, by the multiplexer 10, a signal in a desired frequency band set in advance, for example, any one of the frequency bands f1, f2, f3, and f4. In the spectrum analyzer 1 according to the modification example, the basic measurement operation can be implemented according to the flowchart shown in FIG. 12.

Signal Analyzer 2 Using Multiplexer 10A

The multiplexer 10A (see FIG. 9) according to the above embodiment is applicable not only to the spectrum analyzer 1 shown in FIG. 11 but also to the signal analyzer 2, for example.

Figure 13:
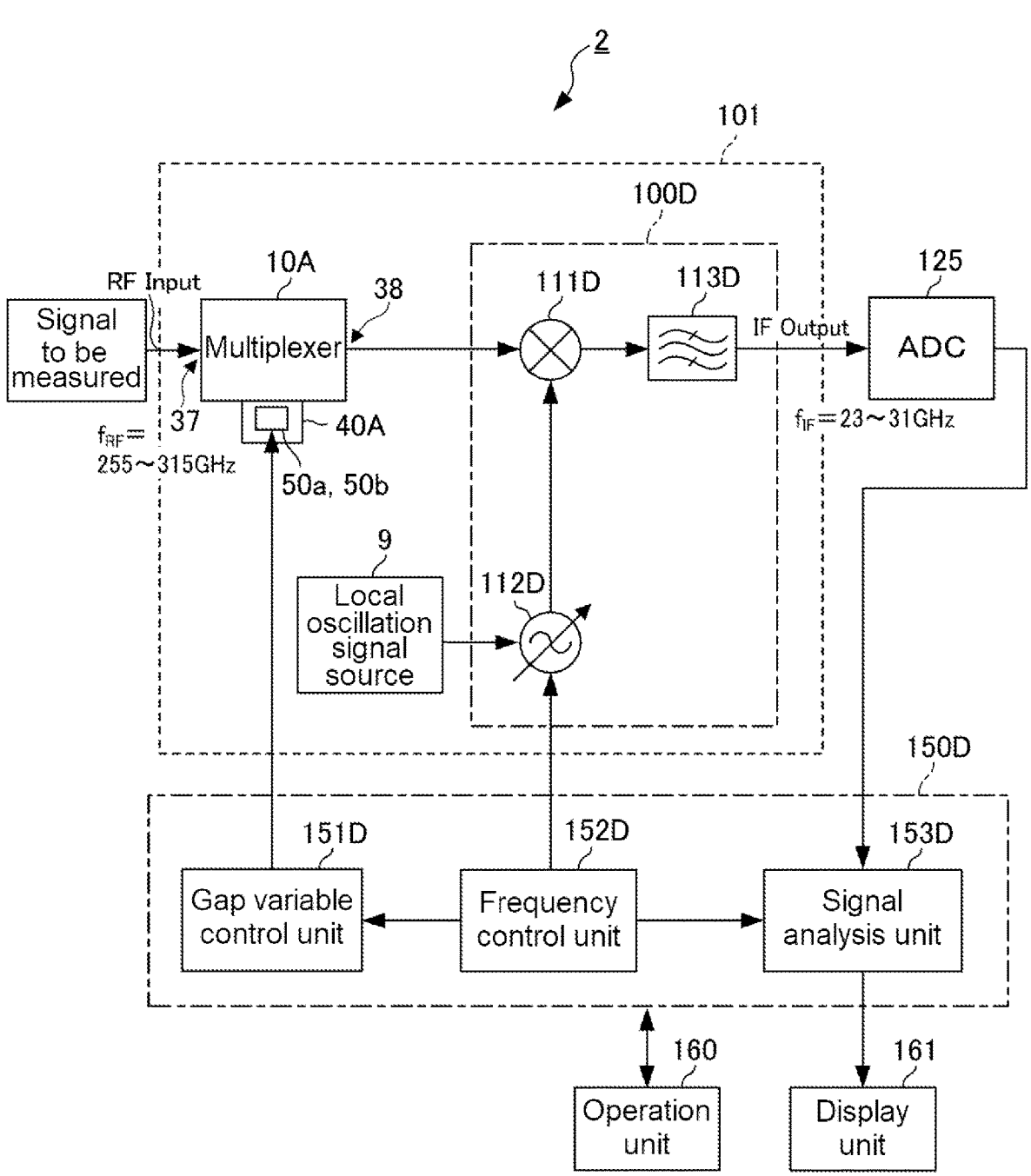
FIG. 13 is a diagram showing a general configuration of a signal analyzer using the multiplexer according to the embodiment of the present invention.

FIG. 13 is a diagram showing a general configuration of a signal analyzer 2 using the multiplexer 10A. The signal analyzer 2 includes a frequency conversion unit 100D, an analog to digital converter (ADC) 125, a control unit 150D, an operation unit 160, and a display unit 161, and also includes the multiplexer 10A including the above-described configuration in a previous stage of the frequency conversion unit 100D. The multiplexer 10A is disposed such that the input port 37 can receive a signal to be measured as RF input, and the output port 38 can send an output signal to the input side of the frequency conversion unit 100D (see FIG. 9).

The frequency conversion unit 100D includes a mixer 111D, a local signal generator 112D, and a filter 113D.

The mixer 111D mixes the signal of each frequency component (RF frequency) in which spurious waves output from the multiplexer 10A are reduced and the local signal input from the local signal generator 112D, and converts the signal to be measured from an RF frequency signal into an intermediate frequency signal (IF frequency) and outputting the signal.

The local signal generator 112D generates a local signal to be sent to the mixer 111D, based on a local signal (reference signal) input from local oscillation signal source 9.

The filter 113D is a filter functional unit that receives the IF signal frequency-converted by the mixer 111D, passes only signals of frequency components of a preset band of the input IF signal, and inputs the signals to the ADC 125.

The ADC 125 is a functional unit that converts a signal (signal to be measured) that has passed through the multiplexer 10A and has been frequency-converted by the frequency conversion unit 100D from an analog signal to a digital signal.

The control unit 150D includes a gap variable control unit 151D, a frequency control unit 152D, and a signal analysis unit 153D. The gap variable control unit 151D is equivalent to the gap variable control unit provided in the control unit 150 of the spectrum analyzer 1 (see FIG. 7).

The frequency control unit 152D performs control to set a local frequency such that a signal in the designated analysis target frequency range can be received when the frequency conversion unit 100D converts the frequency of the signal to be measured. The local signal generator 112D that configures the frequency conversion unit 100D has a configuration that can vary the local frequency in accordance with the received RF frequency. Therefore, the frequency control unit 152D may be configured to drive and control the local signal generator 112D and sweep control the local frequency.

The signal analysis unit 153D executes a process of analyzing the waveform of a signal (signal to be measured) converted into a digital signal by the ADC 125, specifically, a process of generating waveform analysis data for displaying the digital signal as a waveform such as a spectrum.

The signal analysis process of the signal analyzer 2 having the above configuration continues in the same manner up to step S3, as compared to the signal measurement operation of the spectrum analyzer 1 shown in FIG. 11 (see FIG. 12). As a subsequent signal analysis operation, in the signal analyzer 2, after completing the adjustment control of the gap G and the local frequency setting in step S3, the control unit 150E inputs the frequency component corresponding to the adjusted gap G passing through the waveguide path 35 of the multiplexer 10A from the output port 38 to the frequency conversion unit 100 to perform frequency conversion, and inputs the frequency-converted signal to the ADC 125. The ADC 125 converts the frequency-converted signal from an analog signal to a digital signal and inputs the digital signal to the signal analysis unit 153D. The signal analysis unit 153D generates waveform analysis data for displaying the digital signal as a waveform such as a spectrum, from the digital signal input from the ADC 125. The control unit 150D performs control for signal analysis, such as displaying the waveform analysis data generated by the signal analysis unit 153D on the display unit 161.

It goes without saying that the signal analyzer 2 according to the present embodiment may have a configuration the multiplexer 10 (see FIG. 1) having the using configuration of the basic unit, instead of the multiplexer 10A shown in FIG. 9. Further, the gap adjustment mechanism 43 (see FIG. 3) may be used instead of the gap adjustment mechanism 43A.

Signal Generation Device 3 Using Multiplexer 10E

The multiplexer 10A (see FIG. 9) according to the above modification example is applicable not only to the spectrum analyzer 1 shown in FIG. 11 and the signal analyzer 2 shown in FIG. 13, but also applicable to, for example, a signal generation device 3 that performs a reception sensitivity test of a DUT.

Figure 14:
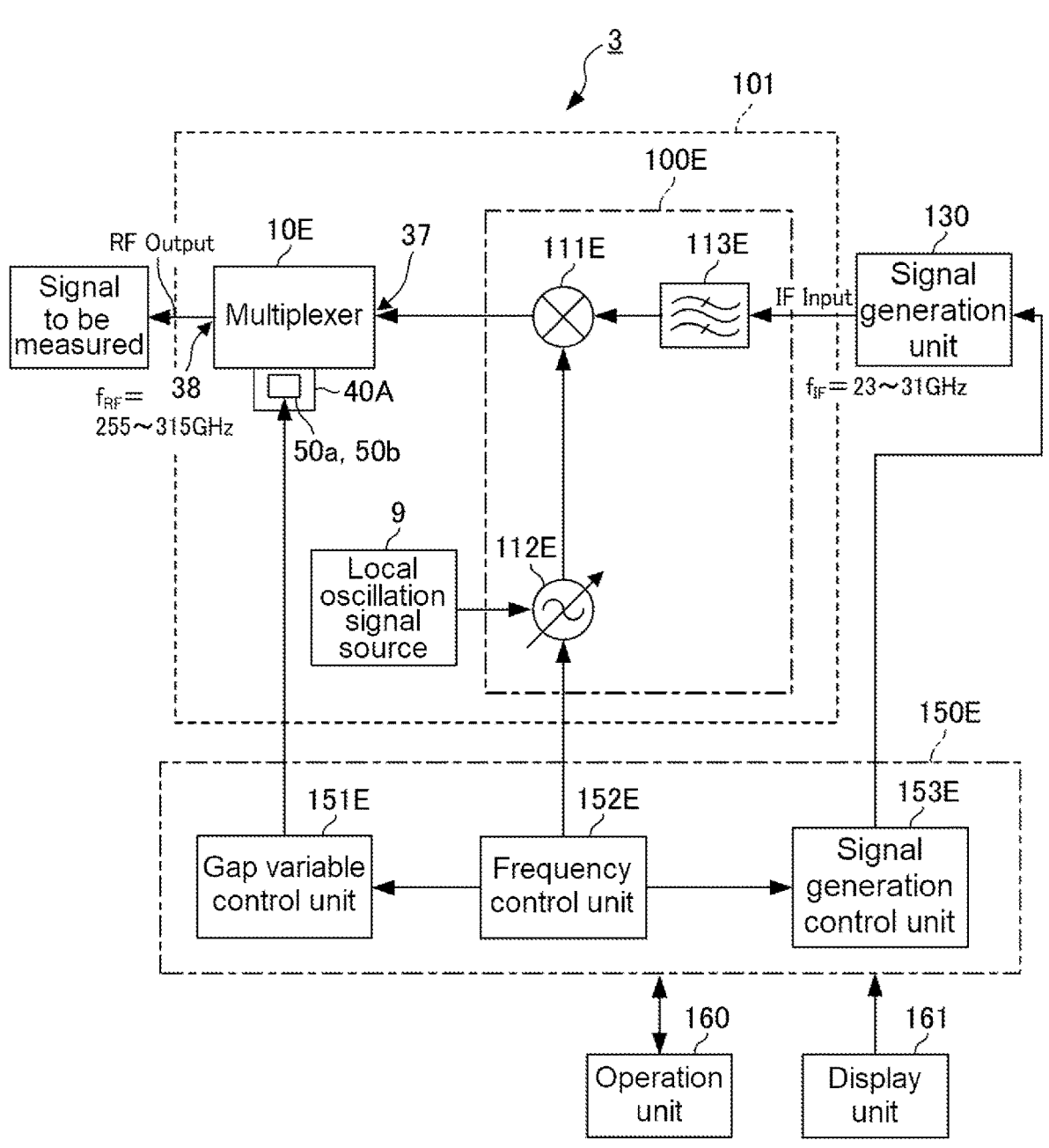
FIG. 14 is a diagram showing a general configuration of a signal generation device using the multiplexer according to the embodiment of the present invention.

FIG. 14 is a diagram showing a general configuration of a signal generation device 3 that uses the above-described multiplexer 10A as the multiplexer 10E. The signal generation device 3 is assumed to be a test signal generation device that generates a test signal for testing the reception sensitivity of a millimeter wave band signal for a DUT.

The signal generation device 3 according to the present embodiment includes a multiplexer 10E provided in the subsequent stage of the frequency conversion unit 100E, in addition to a frequency conversion unit 100E, a signal generation unit 130, a control unit 150E, an operation unit 160, a display unit 161. The frequency conversion unit 100E includes a mixer 111E, a local signal generator 112E, and a filter 113E, and the control unit 150E includes a gap variable control unit 151E, a frequency control unit 152E, and a signal generation control unit 153E.

In the signal generation device 3, the frequency conversion unit 100E gives, to the mixer 111E, the intermediate frequency band test signal output from the signal generation unit 130 under the control of the signal generation control unit 153E together with the local signal output from the local signal generator 112E and performs a process for converting it into a millimeter wave band signal. At this time, the frequency conversion unit 100E changes the frequency of the local signal by the frequency control unit 152E in accordance with, for example, the test target frequency set by the operation unit 160 in order to test the DUT, and sends the frequency-converted signal to the subsequent stage.

As the multiplexer 10E provided in the subsequent stage of the frequency conversion unit 100E, the multiplexer 10 (see FIG. 1), the multiplexer 10A (see FIG. 9), or the like described above can be applied, but here, in particular, the explanation will be given assuming the configuration using the multiplexer 10A (see FIG. 9).

Figure 15:
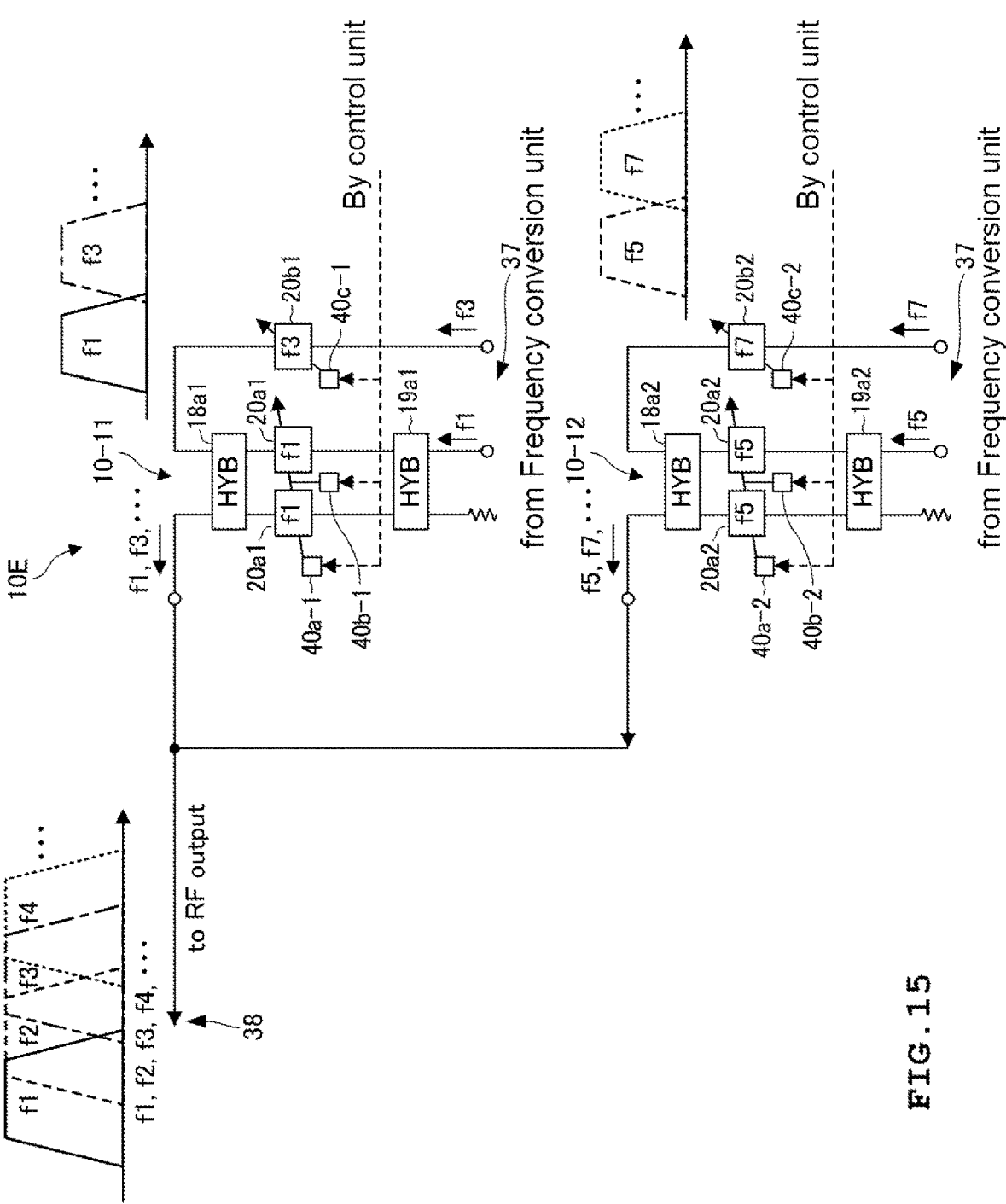
FIG. 15 is a configuration diagram of the multiplexer in the signal generation device using the multiplexer according to the embodiment of the present invention.

That is, in the signal generation device 3, as shown in FIG. 14, the multiplexer 10E is disposed such that an input port 37 is connected to the output side of the frequency conversion unit 100E, and an output port 38 is connected to the input side (the side in which the test signal is transmitted to the outside as an RF Output) of the test signal. The configuration of the multiplexer 10E in the signal generation device 3 is shown in FIG. 15. As shown in FIG. 15, the multiplexer 10E has a signal input/output path that is opposite to that of the multiplexer 10A (see FIG. 9) mounted in the spectrum analyzer 1 and signal analyzer 2 described above (the signal from the frequency conversion unit 100E is input to the input port 37 and is output from the output port 38 to the RF output side). In this way, in the multiplexer 10E, a signal (test signal input from the signal generation unit 130) converted to an RF frequency (for example, frequency bands f1, f2, f3, f4, f5, f6, f7, and f8) is input from the frequency conversion unit 100E side to the input port 37, and the input signal is sent out as a test signal, which is a RF output, via the multiplexer 10E.

Figure 16:
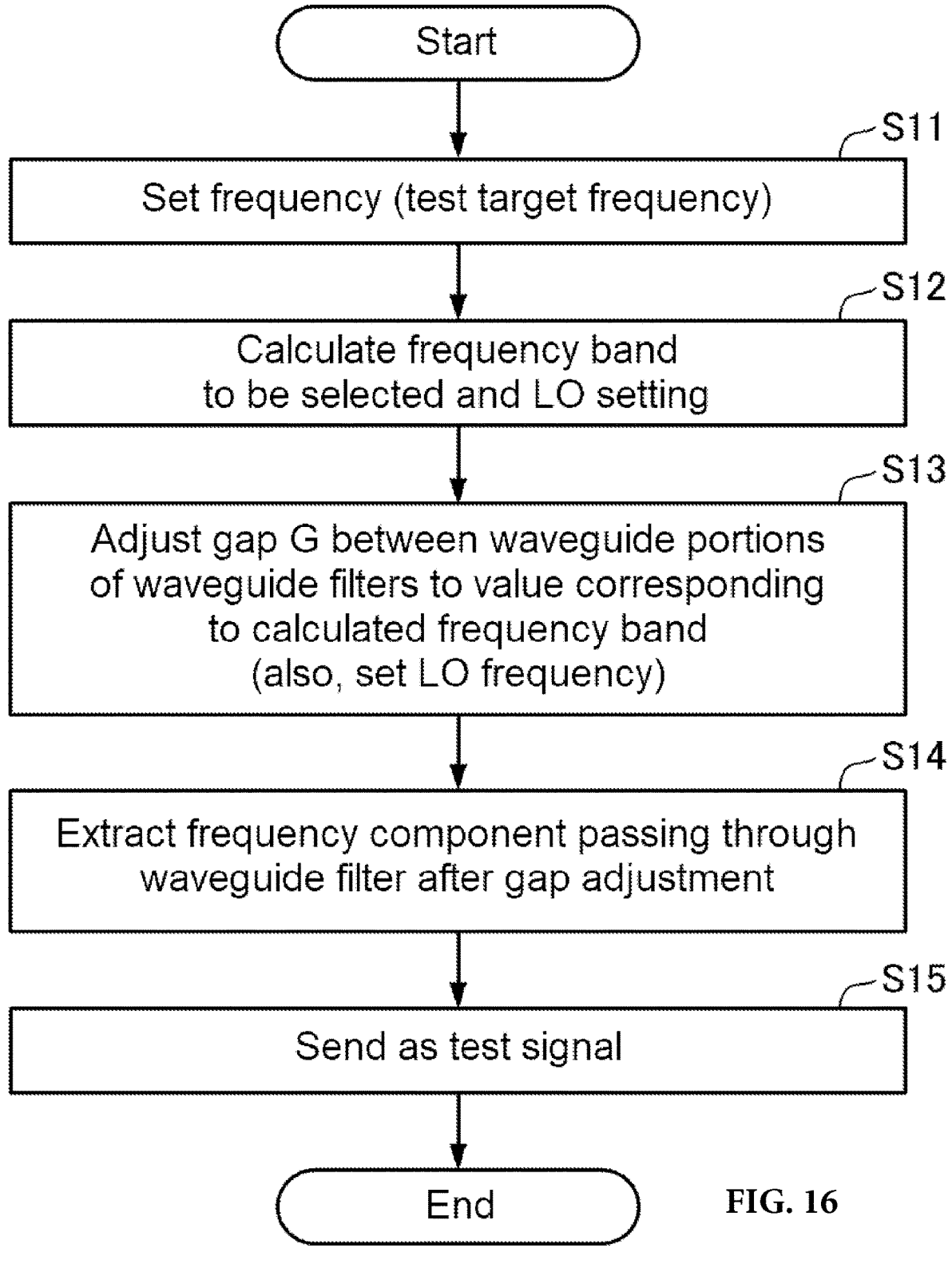
FIG. 16 is a flowchart showing a signal transmission control operation in the signal generation device using the multiplexer according to the embodiment of the present invention.
Figure 17:
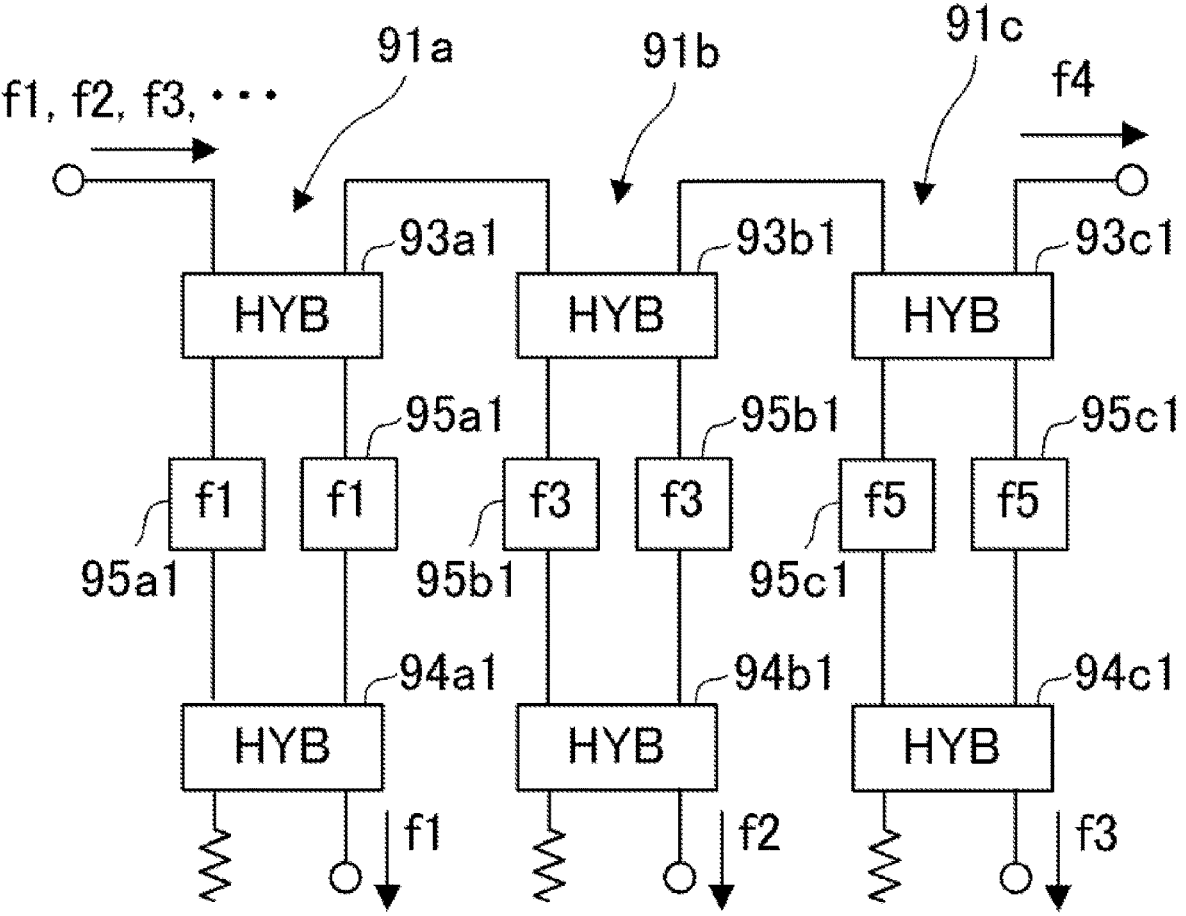
FIG. 17 is a configuration diagram of a BLC filter bank used in a spectrum analyzer in the related art.

The transmission control operation of the test signal of the signal generation device 3 when testing the DUT will be described with reference to the flowchart shown in FIG. 16.

In order to test the DUT, the user performs an operation to set a frequency, that is, a test target frequency, using the operation unit 160, for example (step S11). Examples of the parameters set here include the center frequency, the start frequency, and the stop frequency of each of the frequency bands f1, f2, f3, f4, f5, f6, f7, and f8.

Next, the control unit 150E calculates the passbands (any one of frequency bands f1, f2, f3, f4, f5, f6, f7, f8) to be selected for the multiplexer 10 and LO setting (step S12), based on the frequency range to be tested set in step S11.

Subsequently, the gap variable control unit 151 adjusts and controls the gap G between the first waveguide portion 31a and the second waveguide portion 31b of the multiplexer 10E to be the gap G corresponding to the passband calculated in step S12, for example, any one of G0, G1, and G2 (see FIGS. 3B, 3C, and 3D) (step S13). At this time, the gap variable control unit 151 sends a control signal (gap adjustment control signal) corresponding to the calculated passband to the motors 50a and 50b of the gap adjustment mechanism 43A, for the passband variable means 40a-1, 40b-1, and 40c-1 and the passband variable means 40a-2, 40b-2, and 40c-2, and rotationally drives the motors 50a and 50b until the gap G becomes the value corresponding to the calculated passband. Further, in step S13, control is also performed to set a local frequency based on the LO setting calculated in step S12, for frequency conversion in the frequency conversion unit 100E.

After completing the adjustment control of the gap G and the local frequency setting in step S13, the control unit 150E outputs the frequency component corresponding to the adjusted gap G passing through the waveguide path 35 of the multiplexer 10E from the output port 38 to RF sending unit (not shown) (step S14).

Further, the control unit 150E drives and controls the RF sending unit, and sends out the frequency component signal input from the output port 38 of the multiplexer 10E as a test signal (step S15).

It goes without saying that the signal generation device 3 according to the present embodiment may have a configuration using the multiplexer 10 (see FIG. 1) having the configuration of the basic unit, instead of the multiplexer 10A shown in FIG. 9. In addition, the gap adjustment mechanism 43 (see FIG. 3) may be used instead of the gap adjustment mechanism 43A, as the passband variable means 40a-1, 40b-1, and 40c-1 and the passband variable means 40a-2, 40b-2, and 40c-2.

As described above, the multiplexer 10 according to the present embodiment includes hybrid couplers 18a1 and 19a1 which each have a port P1 (Input), a port P2 (Through), a port P3 (Couple), and a port P4 (Isolated), and are configured with a circuit network that distributes or combines signals, BPFs 20a1 consisting of two filters which have substantially the same characteristics and are connected in parallel between the hybrid coupler 18a1 and the hybrid coupler 19a1, and a BPF connected to the port P4 of the hybrid coupler 18a1 and having a passband adjacent to a passband of the BPFs 20a1, an input signal from the port P1 of the hybrid coupler 18a1 is distributed to the two BPFs 20a1, and the input signals within a passband of each of the BPFs pass through the BPFs 20a1, are combined at the hybrid coupler 19a1 and output from the port P3 of the hybrid coupler 19a1, while the input signals out of the passband of the BPFs 20a1 are reflected, combined at the hybrid coupler 18a1, and output from the port P4 to the BPF 20b1, the multiplexer includes passband variable means 40a, 40b, 40c for varying the passbands of the BPFs 20a1, 20b1 within a range of bands forming mutually overlapping bands within a predetermined frequency range.

With this configuration, the multiplexer 10 according to the present embodiment varies the passbands of the BPFs 20a1 and 20b1 using the passband variable means 40a, 40b, and 40c, thereby easily and continuously varying the passbands without switching the filters, and performing high-precision measurement, analysis, and testing of high-frequency signals, with a simple and inexpensive structure.

Further, the multiplexer 10 according to the present embodiment has a configuration including hybrid couplers 18a1 and 19a1, BPF 20a1, and BPF 20b1 as a basic unit, the plurality of basic units are connected in order such that the port P1 of the hybrid coupler 18a1 of the subsequent basic unit is connected to the port P4 of the hybrid coupler 18a1 or the port P3 of the hybrid coupler 19a1 of the previous basic unit, and the BPFs 20a1 and 20b1 of the previous and subsequent basic units vary the passband such that overlapping bands are formed through continuous bands.

With this configuration, the multiplexer 10 according to the present embodiment can easily construct a filter structure adaptable to a desired passband expanded by combining a plurality of basic units, with a simple structure, and also facilitates high-precision measurement, analysis, and testing of high-frequency signals.

Further, in the multiplexer 10 according to the present embodiment, the corresponding filters of the BPFs 20a1 and 20b1 of each basic unit are configured with any one type or a mixture of a plurality of types of a BPF, a HPF, and an LPF.

With this configuration, the multiplexer 10 according to the present embodiment is configured with hybrid couplers and any one type or a mixture of a plurality of types of a BPF, a HPF, and an LPF to easily achieve a filter structure of a desired specification.

Further, in the multiplexer 10 according to the present embodiment, BPFs 20a1 and 20b1 are configured with waveguide filters 20, and the waveguide filter 20 includes a waveguide portion 30 which includes a first waveguide portion 31a and a second waveguide portion 31b each having a rectangular parallelepiped shape, in which grooves 35a and 35b to become a waveguide path 35 are formed from one end portion 33 to the other end portion 34 in the longitudinal direction in respective one-side surfaces 32a and 32b in the longitudinal direction, the waveguide path 35 is formed by grooves 35a and 35b in a state where the first waveguide portion 31a and the second waveguide portion 31b are arranged facing each other such that one-side surfaces 32a and 32b face each other, and the passband of the waveguide 35 changes according to the gap G between the one-side surface 32a of the first waveguide portion 31a and the one-side surface 32b of the second waveguide portion 31b, and gap adjustment mechanisms 43 and 43A that configure passband variable means 40a, 40b, and 40c and vary the gap G in the waveguide portion 30 such that a desired passband is set.

With this configuration, the multiplexer 10 according to the present embodiment uses the gap adjustment mechanisms 43 and 43A that adjust the gap G between the first waveguide portion 31a and the second waveguide portion 31b of the waveguide filter 20 to easily implement the passband variable means 40a, 40b, and 40c.

Further, in the multiplexer 10 according to the present embodiment, the gap adjustment mechanism 43A includes a first stage 52a on which the first waveguide portion 31a is placed, a second stage 52b on which the second waveguide portion 31b is placed so as to face the first waveguide portion 31a, and motors 50a and 50b that drive the first stage 52a and the second stage 52b to be able to move symmetrically with respect to a plane of symmetry such that the gap G between the first waveguide portion 31a and the second waveguide portion 31b changes.

With this configuration, the multiplexer 10 according to the present embodiment drives the first stage 52a and the second stage 52b to move symmetrically with respect to a plane of symmetry by the motors 50a and 50b, thereby easily and continuously varying the gap G between the first waveguide portion 31a and the second waveguide portion 31b, and improving the filter characteristics when the passband is varied.

Further, in the multiplexer 10 according to the present embodiment, the waveguide portion 30 inputs the signal to be measured in the predetermined frequency range into the waveguide path 35, and outputs, among the plurality of overlapping frequency bands, a frequency component of any one band that matches a passband corresponding to the gap G.

With this configuration, the multiplexer 10 according to the present embodiment can set a desired passband among a plurality of passbands within a predetermined frequency range according to the gap G, by varying the gap G using the gap adjustment mechanisms 43 and 43A.

Further, a spectrum analyzer 1 according to the present embodiment is a spectrum analyzer 1 which includes a frequency conversion unit 100 that gives a signal to be measured in a predetermined frequency range and a local signal output from a local signal generator 112 to a mixer 111D and has a filter 113 that extracts a signal in a predetermined intermediate frequency band from the mixed output, and a detector 120 that detects the signal in the intermediate frequency band, and changes a frequency of the local signal in accordance with an analysis target frequency to obtain spectral characteristics of the signal to be measured, the spectrum analyzer 1 including: the multiplexer 10A having the above-described configuration provided in a previous stage of the frequency conversion unit 100; and gap variable control unit 151 for driving and controlling the passband variable means 40a, 40b, and 40c to set the passband corresponding to one frequency band of the analysis target frequencies, in which a frequency component corresponding to one frequency band of the analysis target frequency is measured through the multiplexer 10A.

With this configuration, the spectrum analyzer 1 according to the present embodiment varies the passbands of the BPFs 20a1 and 20b1 of the multiplexer 10A using the passband variable means 40a, 40b, and 40c, thereby easily and continuously varying the passband without switching the filters, and performing high-precision measurement of high-frequency signals, with a simple and inexpensive structure.

Further, the spectrum analyzer 1 according to the present embodiment has a configuration including hybrid couplers 18a1 and 19a1, BPFs 20a1, and a BPF 20b1 as a basic unit, a multiplexer 10A is configured by combining a plurality of basic units 10-11 and 10-12, and the BPFs 20a1 and 20b1 of each basic unit vary the passbands such that overlapping bands are formed through continuous bands.

With this configuration, the spectrum analyzer 1 according to the present embodiment can easily construct a multiplexer filter structure adaptable to a desired passband expanded by combining a plurality of basic units, with a simple structure, and also facilitates high-precision measurement, analysis, and testing of high-frequency signals.

Further, a signal analyzer 2 according to the present embodiment is a signal analyzer 2 which includes a frequency conversion unit 100D that gives a signal to be measured in a predetermined frequency range and a local signal output from a local signal generator 112 to a mixer 111D and having a filter 113D that extracts a signal in a predetermined intermediate frequency band from the mixed output, and a signal analysis unit 153D that analyzes a waveform of a digital signal obtained by converting the signal in the intermediate frequency band by an ADC 125, and changes a frequency of the local signal in accordance with an analysis target frequency to analyze a waveform of the signal to be measured, the signal analyzer 2 including: the multiplexer 10A having the above-described configuration provided in a previous stage of the frequency conversion unit 100D, and gap variable control unit 151D for driving and controlling the passband variable means 40a, 40b, and 40c to set the passband corresponding to one frequency band of the analysis target frequency, in which a signal of a frequency component corresponding to one frequency band of the analysis target frequency is analyzed through the multiplexer 10A.

With this configuration, the signal analyzer 2 according to the present embodiment varies the passbands of the BPFs 20a1 and 20b1 using the passband variable means 40a, 40b, and 40c, thereby easily and continuously varying the passband without switching the filters and performing high-precision analysis of high-frequency signals, with a simple and inexpensive structure.

Further, a signal generation device 3 according to the present embodiment is a signal generation device 3 including a frequency conversion unit 100E that gives a test signal in an intermediate frequency band output by a signal generation unit 130 and a local signal output from a local signal generator 112E to a mixer 111E and converts the test signal and the local signal into a signal in a predetermined frequency range, the signal generation device changing a frequency of the local signal in accordance with a test target frequency for testing a device under test (DUT), and sending the signal that is frequency-converted by the frequency conversion unit 100E as a test signal of the device under test, the signal generation device including: the multiplexer 10E having the above-described configuration which receives the frequency-converted signal provided in a subsequent stage of the frequency conversion unit 100E; and gap variable control unit 151E for driving and controlling the passband variable means 40a, 40b, and 40c to set the passband corresponding to one frequency band of the test target frequency, in which the test signal having a frequency component corresponding to one frequency band that passes through the multiplexer 10E of the test target frequency is sent.

With this configuration, the signal generation device 3 according to the present embodiment varies the passbands of the BPFs 20a1 and 20b1 using the passband variable means 40a, 40b, and 40c, thereby easily and continuously varying the passband without switching the filters, and performing high-precision DUT testing of high-frequency signals, with a simple and inexpensive structure.

A multiplexer control method is a multiplexer control method in the spectrum analyzer 1, the signal analyzer 2, or the signal generation device 3, which use the multiplexer 10 having the above-described configuration, the method includes a setting step (S1, S11) of setting an analysis target frequency or a test target frequency, a passband variable control step (S3, S13) of driving and controlling the passband variable means 40a, 40b, and 40c such that the passbands to be selected for the BPFs 20a1 and 20b1 are set, based on the set analysis target frequency or test target frequency, and a step (S4, S14) of extracting a frequency component corresponding to the analysis target frequency or the test target frequency that passes through the BPFs 20a1 and 20b1 which have the passbands set by the passband variable means 40a, 40b, and 40c.

With this configuration, the multiplexer control method according to the present embodiment can be applied to a spectrum analyzer 1, a signal analyzer 2, or a signal generation device 3, and vary the passbands of the BPFs 20a1 and 20b1 using the passband variable means 40a, 40b, and 40c, thereby easily and continuously varying the passbands without switching the filters, and performing high-precision measurement, analysis, and testing of high-frequency signals, with a simple and inexpensive structure.

The multiplexers 10, 10A, and the spectrum analyzer 1, the signal analyzer 2, and the signal generation device 3 using the same, and the multiplexer control method according to the present invention are not limited to the configurations described in the embodiments described above, and may be modified or applicable in a various manner.

INDUSTRIAL APPLICABILITY

As described above, the present invention is useful for a multiplexer that can easily vary the passband without switching filters, has a simple and inexpensive structure, and has the advantage capable of handling high-precision measurement, analysis, and testing of high-frequency signals, a spectrum analyzer, signal analyzer, and signal generation device using the same, and a multiplexer control method.

DESCRIPTION OF REFERENCE NUMERALS AND SIGNS

1: Spectrum analyzer
2: Signal analyzer
3: signal generation device
9: Local oscillation signal source
10, 10-11, 10-12, 10A, 10E: Multiplexer
18a1: Hybrid coupler (first hybrid coupler)
19a1: Hybrid coupler (second hybrid coupler)
20a1: BPF (first filter)
20b1: BPF (second filter)
20: Waveguide filter
30: Waveguide portion
31a: First waveguide portion (first waveguide portion)
31b: Second waveguide portion (second waveguide portion)
32a, 32b: One-side surface
33: One end portion (one end)
34: Other end portion (other end)
35: Waveguide path
40, 40A: Gap adjustment portion
40a, 40b, 40c: Passband variable means
41: First stage
42: Second stage
43, 43A: Gap adjustment mechanism
50, 50a, 50b: Motor (drive means)
52a: First stage (first stage member)
52b: Second stage (second stage member)
100, 100D, 100E: Frequency conversion unit
111, 111D, 111E: Mixer
112, 112D, 112E: Local signal generator
113, 113D, 113E: Filter
120: Detector
125: Analog to digital converter (ADC)
130: Signal generation unit
150, 150D, 150E: Control unit
151, 151D, 151E: Gap variable control unit (passband variable control means)
152: Frequency sweep control unit
152D, 152E: Frequency control unit
153: Spectrum data acquisition unit
153D: Signal analysis unit
153E: Signal generation control unit
160: Operation unit
161: Display unit

What is claimed is:

1. A multiplexer comprising:
a first hybrid coupler and a second hybrid coupler which each have a port P1 (Input), a port P2 (Through), a port P3 (Couple), and a port P4 (Isolated), and are configured with a circuit network that distributes or combines signals;
a first filter consisting of two filters which have substantially the same characteristics and are connected in parallel between the ports P2 and P3 of the first hybrid coupler and the ports P1 and P4 of the second hybrid coupler; and
a second filter connected to the port P4 of the first hybrid coupler and having a passband adjacent to a passband of the first filter of the second hybrid coupler, wherein
an input signal from the port P1 of the first hybrid coupler is distributed to the first filter, and the input signal that passes through the first filter is combined at the second hybrid coupler and output from the port P3 of the second hybrid coupler,
while the input signals are reflected, combined at the first hybrid coupler, and output from the port P4 of the first hybrid coupler to the second filter, and
passband variable means are provided for varying the passbands of the first filter and the second filter within a range of bands in which mutually overlapping bands are formed within a predetermined frequency range.

2. The multiplexer according to claim 1, wherein
with a configuration including the first hybrid coupler, the second hybrid coupler, the first filter, and the second filter as a basic unit, a plurality of the basic units are connected in order such that the port P1 of the first hybrid coupler of a subsequent basic unit is connected to the port P4 of the first hybrid coupler or the port P3 of the second hybrid coupler of a previous basic unit, and
the first filters and the second filters of the previous and subsequent basic units vary the passbands such that overlapping bands are formed through continuous bands.

3. The multiplexer according to claim 2, wherein
the first filter and the second filter of each of the basic units are configured with any one type or a mixture of a plurality of types of a band-pass filter, a high-pass filter, and a low-pass filter.

4. The waveguide according to claim 1, wherein
the first filter and the second filter are configured with a waveguide filter, and
the waveguide filter includes
a waveguide portion provided with a first waveguide portion and a second waveguide portion which each have a rectangular parallelepiped shape, and in which grooves to become a waveguide path are formed on one-side surfaces in a longitudinal direction from one end to the other end in the longitudinal direction, the waveguide path being formed by the grooves in a state where the first waveguide portion and the second waveguide portion are arranged facing each other such that the one-side surfaces face each other, and a passband of the waveguide path changing according to a gap between the one-side surface of the first waveguide portion and the one-side surface of the second waveguide portion, and
a gap adjustment mechanism that configures the passband variable means and varies the gap in the waveguide portion to set a desired passband.

5. The multiplexer according to claim 4, wherein
the gap adjustment mechanism includes
a first stage member on which the first waveguide portion is placed,
a second stage member on which the second waveguide portion is placed so as to face the first waveguide portion, and
drive means for driving the first stage member and the second stage member to be able to move symmetrically with respect to a plane of symmetry such that the gap between the first waveguide portion and the second waveguide portion changes.

6. The multiplexer according to claim 5, wherein
the waveguide portion inputs a signal to be measured in the predetermined frequency range into the waveguide path, and outputs, among a plurality of overlapping frequency bands, a frequency component of any one of the bands that matches a passband corresponding to the gap.

7. A spectrum analyzer which includes a frequency conversion unit that gives a signal to be measured in a predetermined frequency range and a local signal output from a local signal generator to a mixer and has a filter that extracts a signal in a predetermined intermediate frequency band from the mixed output, and a detector that detects the signal in the intermediate frequency band, and changes a frequency of the local signal in accordance with an analysis target frequency to obtain spectral characteristics of the signal to be measured, the spectrum analyzer comprising:

the multiplexer according to claim 1 provided in a previous stage of the frequency conversion unit; and passband variable control means for driving and controlling the passband variable means to set the passband corresponding to one frequency band of the analysis target frequency, wherein a frequency component corresponding to the one frequency band of the analysis target frequency is measured through the multiplexer.

8. The spectrum analyzer according to claim 7, wherein with a configuration including the first hybrid coupler, the second hybrid coupler, the first filter, and the second filter as a basic unit, the multiplexer is configured by combining a plurality of the basic units, and the first filter and the second filter of each of the basic units vary the passbands such that overlapping bands are formed through continuous bands.

9. A signal analyzer which includes a frequency conversion unit that gives a signal to be measured in a predetermined frequency range and a local signal output from a local signal generator to a mixer and has a filter that extracts a signal in a predetermined intermediate frequency band from the mixed output, and a signal analysis unit that analyzes a waveform of a digital signal obtained by converting the signal in the intermediate frequency band by an ADC, and changes a frequency of the local signal in accordance with an analysis target frequency to analyze a waveform of the signal to be measured, the signal analyzer comprising:

the multiplexer according to claim 1 provided in a previous stage of the frequency conversion unit; and passband variable control means for driving and controlling the passband variable means to set the passband corresponding to one frequency band of the analysis target frequency, wherein a signal of a frequency component corresponding to the one frequency band of the analysis target frequency is analyzed through the multiplexer.

10. A signal generation device including a frequency conversion unit that gives a test signal in an intermediate frequency band output by a signal generation unit and a local signal output from a local signal generator to a mixer and converts the test signal and the local signal into a signal in a predetermined frequency range, the signal generation device changing a frequency of the local signal in accordance with a test target frequency for testing a device under test (DUT), and sending the signal that is frequency-converted by the frequency conversion unit as a test signal of the device under test, the signal generation device comprising:

the multiplexer according to claim 1 which receives the frequency-converted signal provided in a subsequent stage of the frequency conversion unit; and passband variable control means for driving and controlling the passband variable means to set the passband corresponding to one frequency band of the test target frequency, wherein the test signal having a frequency component corresponding to one frequency band that passes through the multiplexer of the test target frequency is sent.

11. A multiplexer control method in a spectrum analyzer, a signal analyzer, or a signal generation device using the multiplexer according to claim 1, the multiplexer control method comprising:

a setting step of setting an analysis target frequency or a test target frequency;

a passband variable control step of driving and controlling the passband variable means such that the passband to be selected for the first filter and the second filter is set, based on the set analysis target frequency or test target frequency; and a step of extracting a frequency component corresponding to the analysis target frequency or test target frequency that passes through the first filter and the second filter which have the passband set by the passband variable means.

* * * * *